(12) United States Patent
Magno, Jr. et al.

(10) Patent No.: US 8,845,361 B2
(45) Date of Patent: Sep. 30, 2014

(54) EXPLOSION-PROOF ELECTRICAL FITTING

(71) Applicant: Thomas & Betts International, Inc., Wilmington, DE (US)

(72) Inventors: Joey D. Magno, Jr., Cordova, TN (US); Rasoul Shouri, Oolteway, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 44 days.

(21) Appl. No.: 13/658,393

(22) Filed: Oct. 23, 2012

(65) Prior Publication Data

US 2013/0112475 A1    May 9, 2013

Related U.S. Application Data

(60) Provisional application No. 61/556,931, filed on Nov. 8, 2011.

(51) Int. Cl.
*H01R 13/52* (2006.01)
*H02G 15/04* (2006.01)
*H02G 15/013* (2006.01)

(52) U.S. Cl.
CPC ........... *H02G 15/046* (2013.01); *H02G 15/013* (2013.01); *Y10S 439/936* (2013.01); *Y10S 439/91* (2013.01)
USPC ............................. 439/587; 439/936; 439/910

(58) Field of Classification Search
USPC .................................... 439/587, 589, 936, 910
See application file for complete search history.

(56) References Cited

U.S. PATENT DOCUMENTS

| | | | |
|---|---|---|---|
| 2,711,438 A | 6/1955 | Bissell | |
| 2,835,722 A | 5/1958 | Appleton | |
| 3,098,275 A | 7/1963 | Schweitzer | |
| 3,761,601 A | 9/1973 | Kaesser et al. | |
| 4,216,349 A | 8/1980 | Wium | |
| 4,301,325 A | 11/1981 | Hutchison | |
| 4,549,037 A | 10/1985 | Bawa et al. | |
| 4,814,547 A | 3/1989 | Riley et al. | |
| 4,894,014 A * | 1/1990 | Palus et al. | 439/17 |
| 5,015,804 A | 5/1991 | Nattel et al. | |
| 5,023,402 A | 6/1991 | King, Jr. et al. | |
| 5,113,037 A | 5/1992 | King, Jr. et al. | |
| 5,310,963 A * | 5/1994 | Kennelly | 174/667 |
| 5,399,807 A | 3/1995 | Yarbrough et al. | |

(Continued)

OTHER PUBLICATIONS

Assembly Fitting Instructions for Installation of CMP Cable Connector Type TMC2X, CMP Products, Jul. 2011, 2 pages, Issue No. 3, St. Peters, Newcastle.

*Primary Examiner* — Gary Paumen
(74) *Attorney, Agent, or Firm* — Snyder, Clark, Lesch & Chung, LLP

(57) ABSTRACT

A fitting, for terminating an electrical cable having two or more conductors, includes a substantially tubular body having a central bore configured to receive the electrical cable therethrough. A substantially tubular sealing sleeve is configured to engage a forward end of the body during assembly of the fitting to receive the two or more conductors of the electrical cable passing through the body. After receiving the two or more conductors, the sealing sleeve is configured to receive a sealing compound therein, such that the sealing compound flows between the two or more conductors during filling of the sealing sleeve. The sealing sleeve is formed of a transparent material to enable visible confirmation of sealing compound distribution and a determination that the sealing compound is free of voids or air bubbles.

24 Claims, 22 Drawing Sheets

(56) References Cited

U.S. PATENT DOCUMENTS

| | | | | |
|---|---|---|---|---|
| 5,499,448 | A * | 3/1996 | Tournier et al. | 29/863 |
| 5,622,642 | A * | 4/1997 | Edwards et al. | 219/542 |
| 5,683,273 | A | 11/1997 | Garver et al. | |
| 5,756,972 | A * | 5/1998 | Vranicar et al. | 219/541 |
| 6,025,559 | A | 2/2000 | Simmons | |
| 6,232,554 | B1 | 5/2001 | Yamazaki et al. | |
| 6,394,662 | B1 * | 5/2002 | Foster | 385/60 |
| 6,475,029 | B2 | 11/2002 | Tucker et al. | |
| 6,854,996 | B2 | 2/2005 | Yaworski et al. | |
| 6,932,639 | B2 * | 8/2005 | Woodruff | 439/403 |
| 7,014,502 | B2 | 3/2006 | Rasmussen | |
| 7,037,128 | B2 | 5/2006 | Yaworski et al. | |
| 7,094,972 | B2 | 8/2006 | Rodrigues et al. | |
| 7,201,596 | B1 | 4/2007 | Bukovnik et al. | |
| 7,341,255 | B2 | 3/2008 | Babiarz et al. | |
| 7,431,611 | B2 | 10/2008 | King, Jr. et al. | |
| 7,592,545 | B2 | 9/2009 | Babiarz et al. | |
| 7,717,740 | B2 * | 5/2010 | Zahnen et al. | 439/521 |
| 7,736,165 | B2 | 6/2010 | Bukovnik et al. | |
| 7,736,187 | B2 * | 6/2010 | Yaworski et al. | 439/620.26 |
| 7,914,298 | B2 * | 3/2011 | Lauermann et al. | 439/76.1 |
| 2004/0121639 | A1 | 6/2004 | Yaworski et al. | |
| 2004/0157448 | A1 | 8/2004 | Yates et al. | |
| 2007/0161268 | A1 * | 7/2007 | Muschketat | 439/76.1 |
| 2008/0121428 | A1 | 5/2008 | Babiarz et al. | |
| 2010/0108020 | A1 | 5/2010 | Miretti | |

* cited by examiner

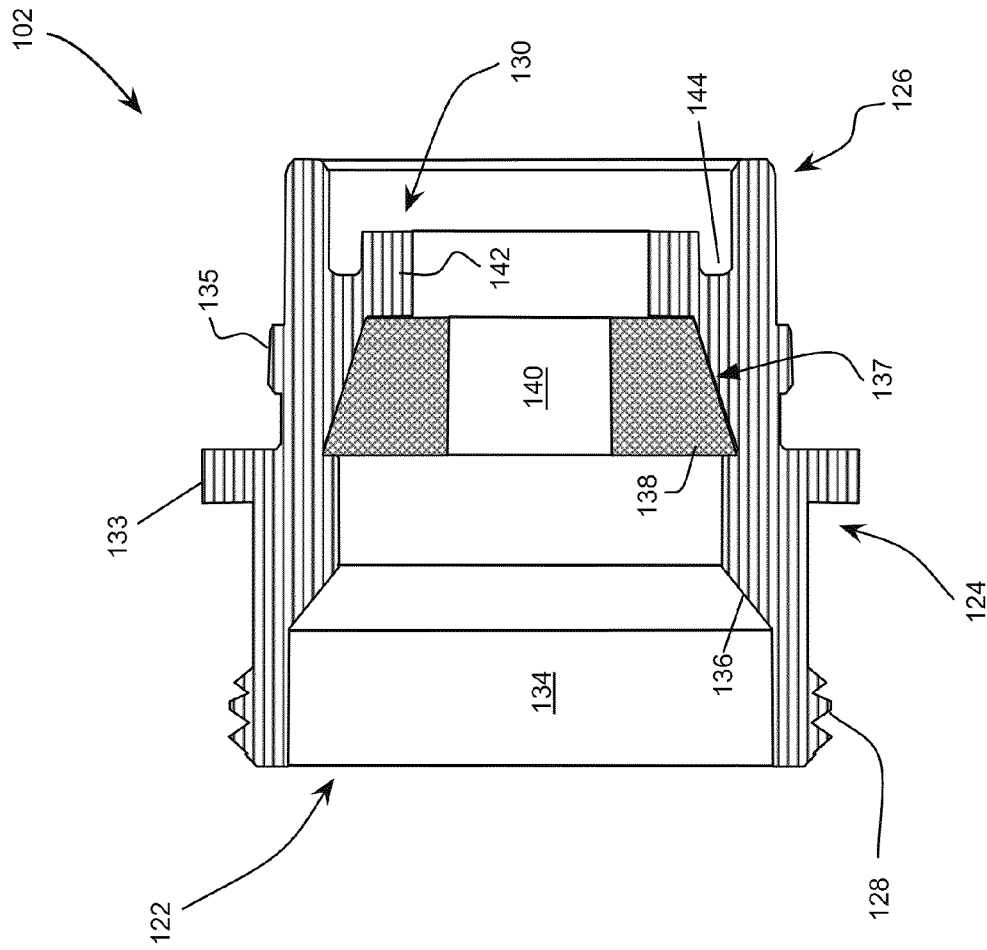

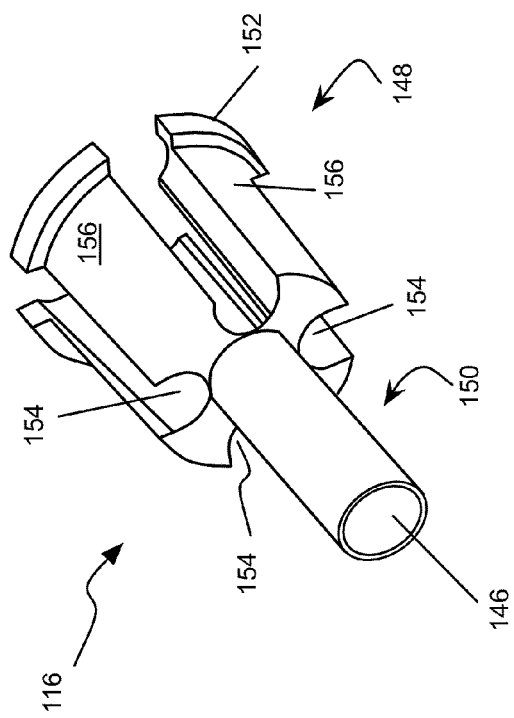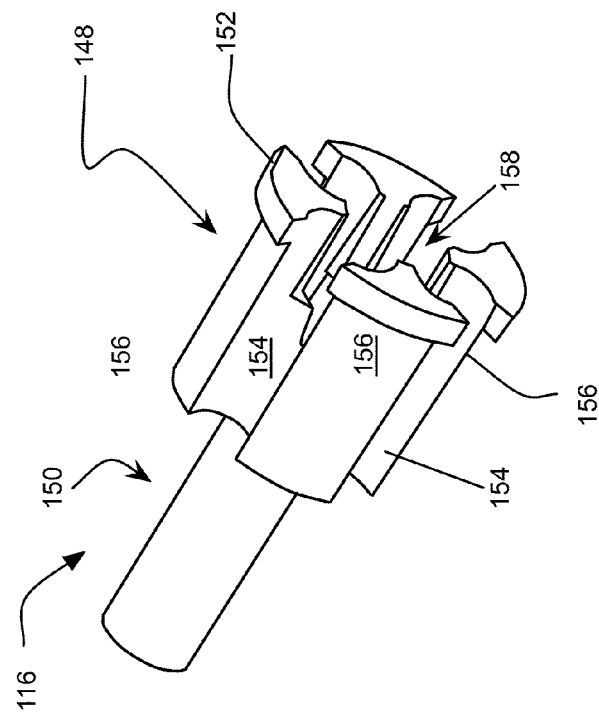

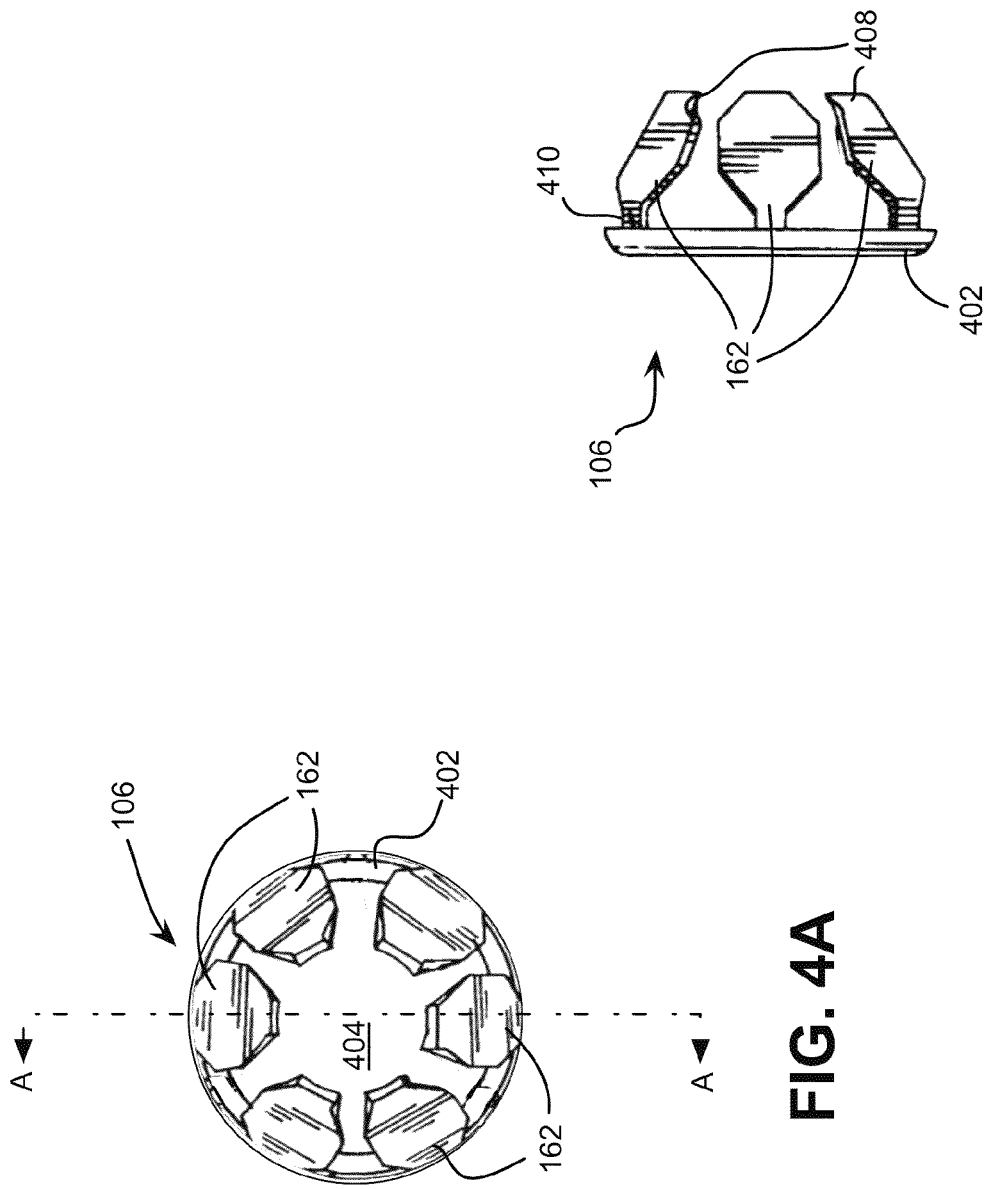

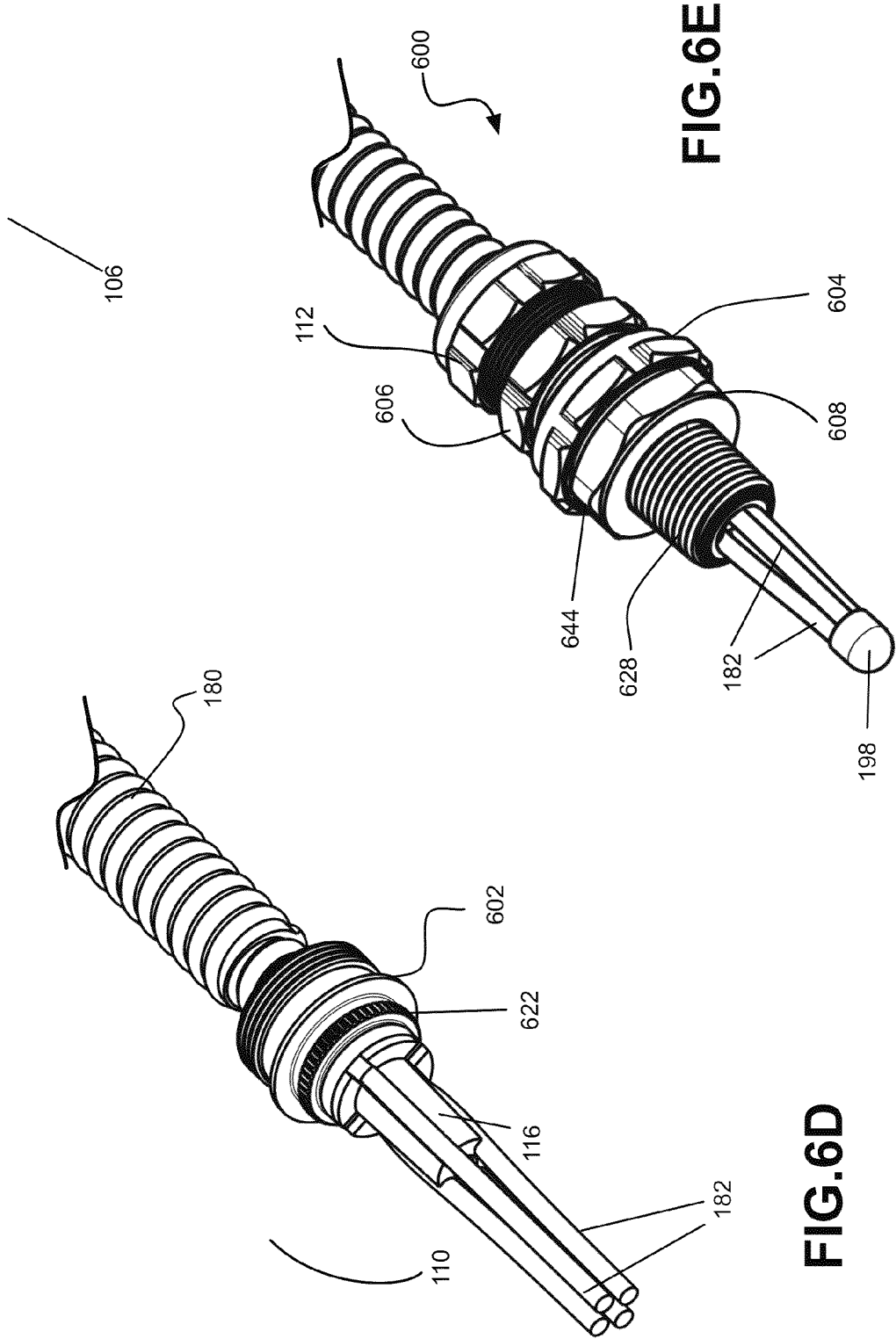

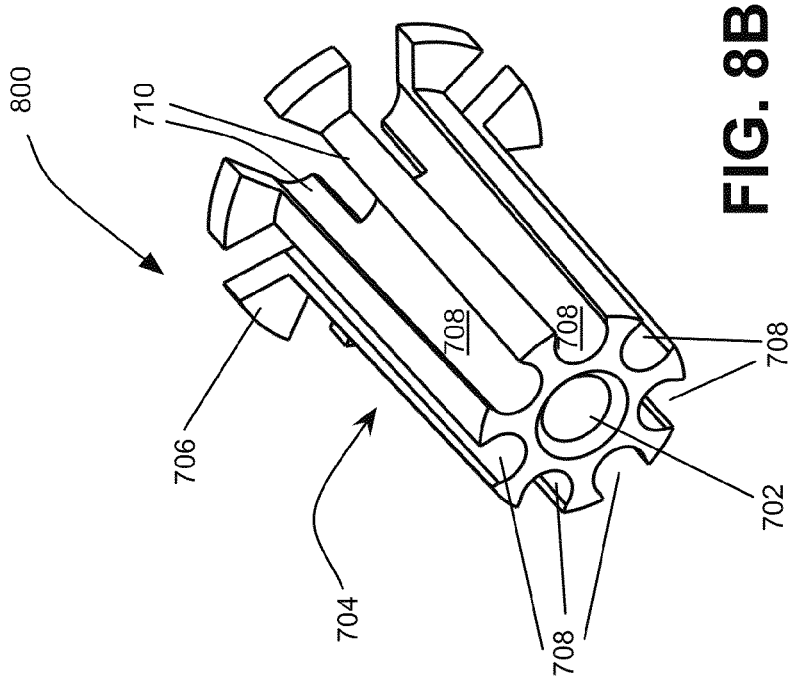
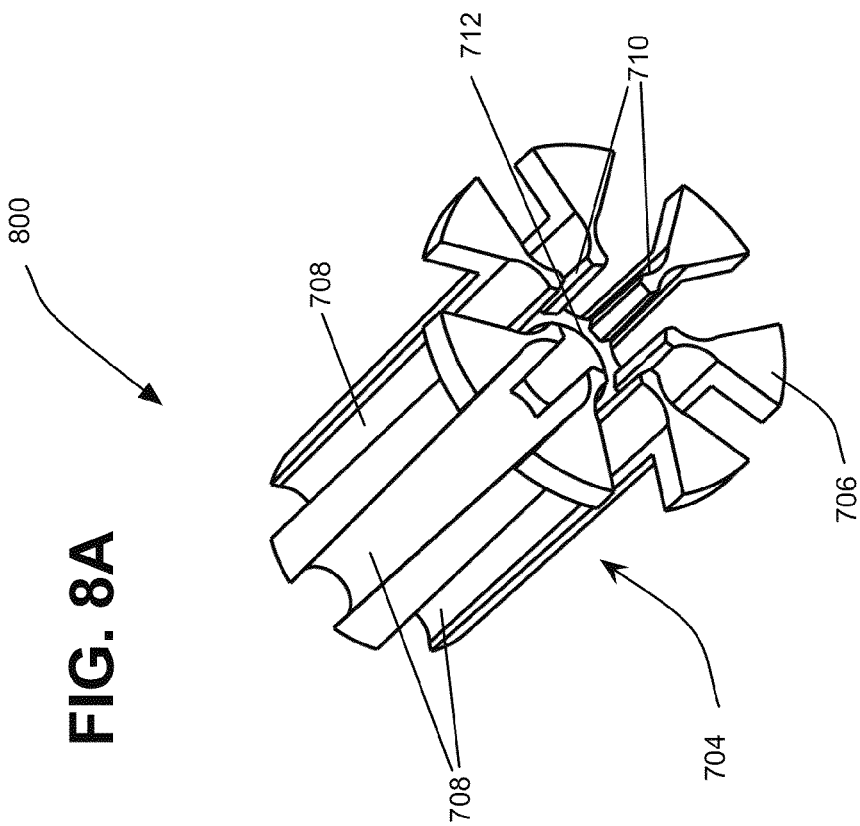
FIG. 8B
FIG. 8A

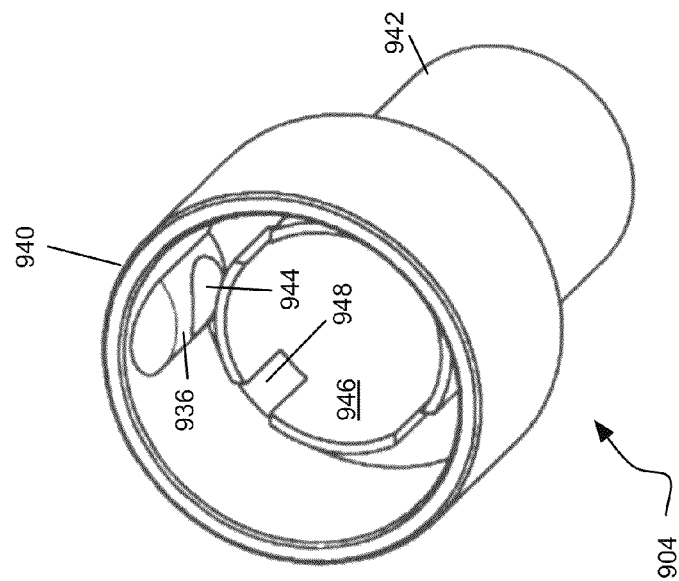
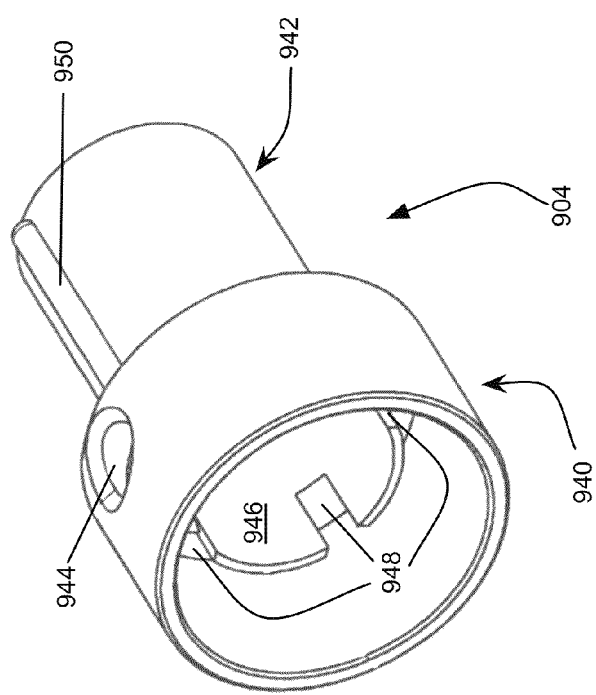

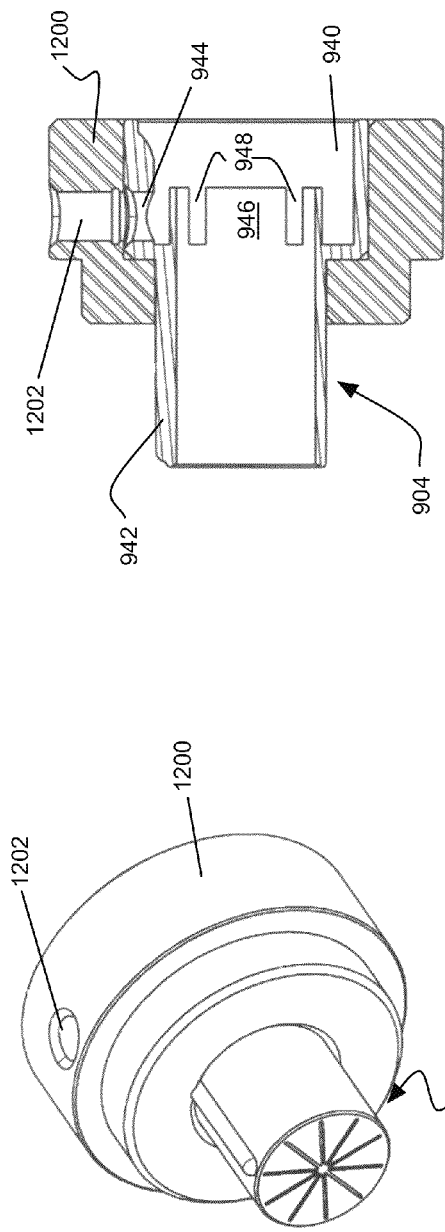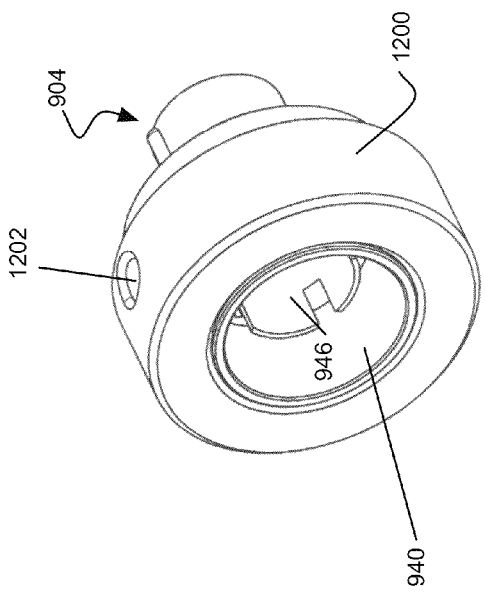
FIG. 12B
FIG. 12C
FIG. 12A

EXPLOSION-PROOF ELECTRICAL FITTING

CROSS-REFERENCE TO RELATED APPLICATION

This application claims priority under 35. U.S.C. §119, based on U.S. Provisional Patent Application No. 61/556,931 filed Nov. 8, 2011, the disclosure of which is hereby incorporated by reference herein.

BACKGROUND OF THE INVENTION

Connectors and fittings have long been used to terminate and connect cables or conduits that carry electrical power or communication signals. Electrical cables are supplied in various configurations often based upon a particular use or the location in which the cables are to be used. One type of electrical cable includes a metallic outer sheath or cladding, sometimes referred to as armor. This type of cable may include a number of insulated conductors extending within the metallic sheath.

Connectors used to terminate these types of cables are typically configured to seal the cable to the connector and also provide for grounded electrical engagement between the metallic sheath of the cable and the body of the connector.

In high voltage environments, additional factors may arise, such as the possibility of arcing or flashover between conducting elements of an electrical connector during connection of disconnection of the connector or during use of the cable. Ignition can also come from elsewhere other than arching between conductors. For example, sparks from metal to metal contacts, lightning, ground fault, etc.

Accordingly, connectors in such high voltage or hazardous environments should apply power in a manner that will not damage equipment, and in a manner that provides a safe environment for users.

BRIEF DESCRIPTION OF THE DRAWINGS

FIG. 1C is a cross-sectional view of the body of FIG. 1A;

FIGS. 2A and 2B are rear and front isometric views, respectively, of an exemplary sealing cartridge of FIG. 1A;

FIGS. 4A and 4B are front and side views, respectively, of an exemplary grounding element of FIG. 1A;

FIGS. 6D and 6E are isometric views of the fitting of FIG. 6A in a partially assembled and an assembled configuration, respectively;

FIGS. 8A and 8B are rear and front isometric views, respectively, of another exemplary sealing cartridge;

FIGS. 11A and 11B are rear and front isometric views, respectively, of one embodiment of the sealing sleeve of FIG. 9;

FIGS. 12A-12C are front and rear isometric, and cross-section views, respectively of a vibration device for agitating the sleeve of FIG. 9;

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

One or more embodiments disclosed herein relate to improved electrical cable fittings for terminating metal clad cables in high voltage environments. More specifically, the described electrical cable fittings may include a main nut, a body, and a hub nut each having a central bore therein. The body includes a pre-installed annular seal retained within its central bore for providing an initial seal within the body. A sealing cartridge may be received within a substantially tubular sealing sleeve and may include radial notches therein for receiving divided conductors of the electrical cable therein and maintaining the conductors in a spaced relationship with respect to each other within the fitting. The tubular sealing sleeve may engage the body following insertion of the cartridge therein, thereby forming a sleeve that surrounds the sealing cartridge and the conductors positioned therein.

During assembly of the fitting, a sealing compound is delivered to the sealing sleeve and allowed to flow between and around the conductors and the sealing cartridge to prevent arcing between the conductors. In one implementation, the sealing sleeve and sealing cartridge may be formed of a transparent material, such as a transparent plastic, to allow visible confirmation of sufficient distribution of the sealing compound. Following visual confirmation of such distribution, the body may be secured between the hub nut and the main nut.

In another embodiment, a cap guide may be provided initially attached to a cap guide ring positioned in the fitting between the main nut and a gland nut. During assembly, insertion of the conductors of the electrical cable may cause a cup-shaped portion to be detached from the cap guide ring. The cup-shaped portion of the cap guide may keep the conductors in a proximal relationship relative to each other as the cable is propelled through the fitting. Once the end of the cable proceeds past the body of the fitting, the cup-shaped portion may be removed from the end of the conductors and discarded.

Figure 1A:
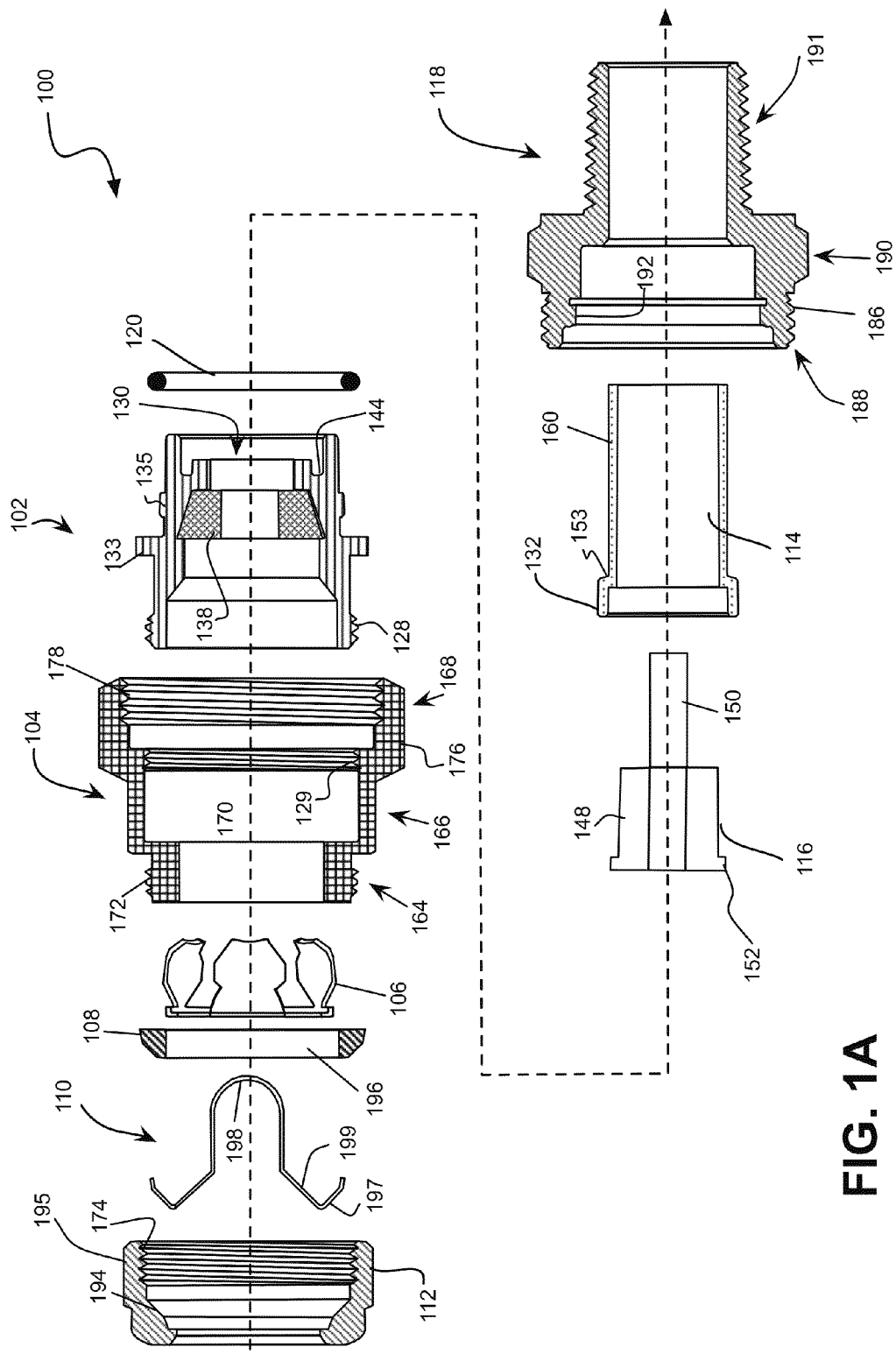
FIG. 1A is an exploded cross-sectional view of an exemplary embodiment of an explosion-resistant electrical cable fitting consistent with implementations described herein.
Figure 1B:
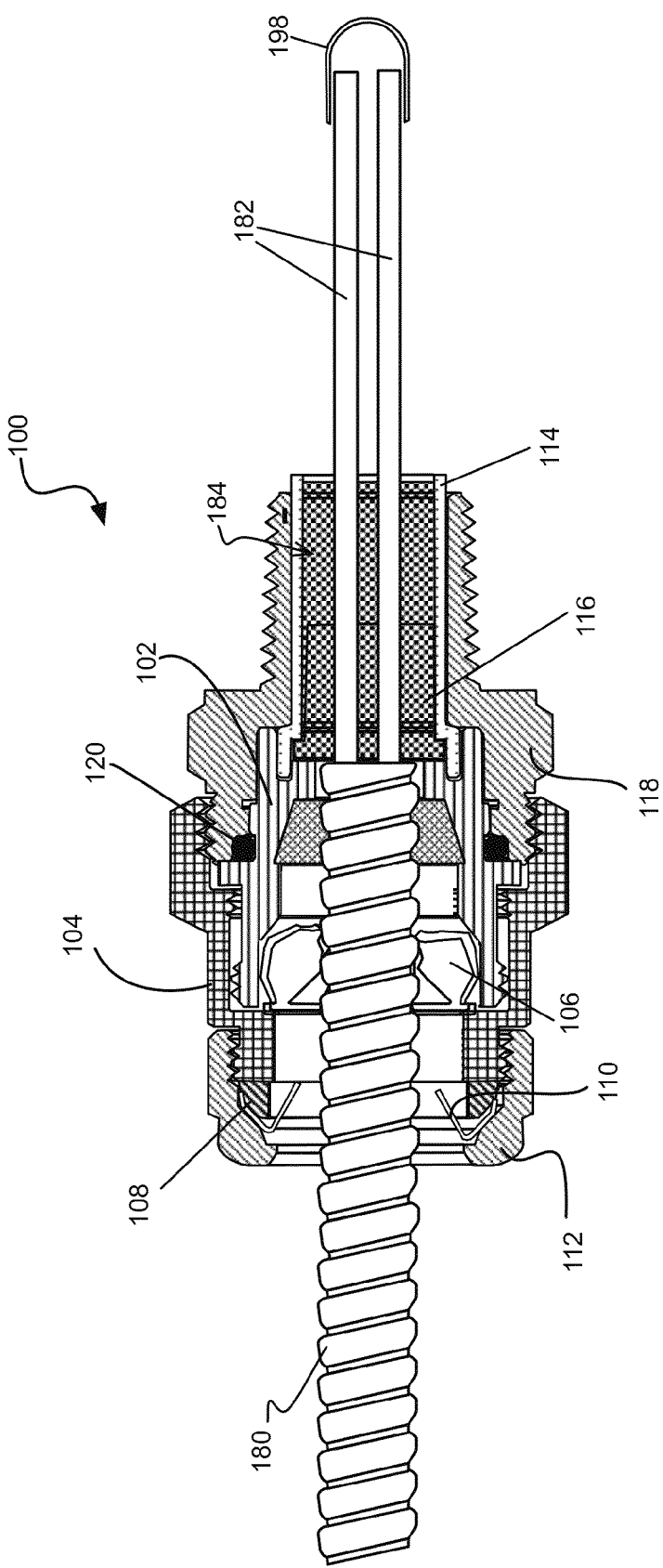
FIG. 1B is a cross-sectional view of the electrical fitting of FIG. 1B in an assembled configuration.

FIG. 1A is an exploded cross-sectional view of an exemplary embodiment of an electrical cable fitting 100 consistent with implementations described herein. FIG. 1B is a cross-sectional view of fitting 100 in an assembled configuration. As illustrated in FIGS. 1A and 1B, fitting 100 may include a body 102, a main nut 104, a grounding element 106, a compression bushing 108, a cap guide 110, a gland nut 112, a sealing sleeve 114, a sealing cartridge 116, a hub nut 118, and an O-ring 120. In the following description, the relative terms "rearward" and "forward" are used to designate various portions or components of fitting 100 in reference to a direction of insertion of an electrical cable therein. It should be understood that these terms are descriptive only and that in some implementations, the terms may be reversed, such as in reference to a removal of the electrical cable from fitting 100.

FIG. 1C is a cross-sectional view of body 102. As shown, body 102 may include an elongate hollow generally tubular member having an enlarged cable receiving end 122, an intermediate portion 124, and a smaller conductor egressing end 126 opposing cable receiving end 122. Cable receiving end 122 may include external threads 128 formed thereon for engaging internal threads 129 in main nut 104 in the manner described below. Conductor egressing end 126 may include a sleeve receiving portion 130 configured to engage a rearward end 132 of sealing sleeve 114 during assembly of fitting 100. An external annular flange 133 and annular rib 135 may be provided between cable receiving end 122 and conductor egressing end 126. As described below, flange 133 may engage a portion of main nut 104 and act as a positive stop during assembly of fitting 100. Further, as shown in FIG. 1B, flange 133 and rib 135 may together engage O-ring 120 to provide seal fitting 100 from outside environmental moisture.

Body 102 may include an internal central bore 134 extending along a central longitudinal axis (depicted as a dashed line in FIG. 1A) between cable receiving end 122 and conductor egressing end 126. In one embodiment, central bore 134 may include a first angled annular portion 136 for engaging grounding element 106 and a second angled annular portion 137, positioned forwardly of first angled annular portion 136, for engaging and/or retaining an integrated sealing barrier 138 therein.

As shown in FIG. 1A, integrated sealing barrier 138 may be provided within body 102 and may include a tubular bore 140 formed therein for resiliently receiving a portion of an electrical cable inserted therethrough (see, e.g., cable 180 in FIG. 1B). In some implementations, sealing barrier 138 may be formed of a resilient material, such as latex, rubber, etc. As described below, during assembly of fitting 100, sealing barrier 138 may engage inserted electrical cable 180 and prevent the injected or distributed sealing compound from flowing into a portion of body 102 and fitting 100 rearward of barrier 138. In some embodiments, sealing barrier 138 may be formed or positioned with body 102 prior to assembly of fitting 100, e.g., during the manufacture of fitting 100.

Sleeve receiving portion 130 of body 102 may include an internal tubular portion 142 projecting radially inwardly from tubular bore 140 and having an inside diameter smaller than the inside diameter of the remainder of body 102. A rearward end of internal tubular portion 140 may receive/engage a forward end of sealing barrier 138.

As shown in FIG. 1A, the forward end of internal tubular portion 142 may include an annular groove 144 formed therein for receiving rearward end 132 of sealing sleeve 114, as described below. In addition, the forward end of tubular portion 142 may have an internal diameter sized to receive the exposed conductors of electrical cable 180 and may be larger than an outside diameter of a rearward portion of sealing cartridge 116, thus effectively retaining sealing cartridge 116 within sealing sleeve 114 upon assembly (or partial assembly) of fitting 100.

FIGS. 2A and 2B are front and rear isometric views, respectively, of an exemplary sealing cartridge 116. As shown, in FIGS. 1A, 2A, and 2B, sealing cartridge 116 may have a generally tubular configuration to be received within sealing sleeve 114, as described below. Sealing cartridge 116 may include a central bore 146 formed therethrough, conductor separating portion 148, and a sealant administration portion 150. Conductor separating portion 148 may include an annular shoulder 152 and a number of radially spaced conductor maintaining notches or slots 154 formed axially in a periphery of conductor spacing portion 148.

In one implementation, annular shoulder 152 is formed at a rearward end of cartridge 116 and may be configured to engage a corresponding shoulder portion 153 in sealing sleeve 114, during insertion of sealing cartridge 116 into sealing sleeve 114. As shown in FIGS. 2A and 2B, in one embodiment, each of slots 154 may having a generally cylindrical configuration, although other non-cylindrical shapes or cross-sections may also be used. Additionally, conductor separating portion 148 may include a number of rearwardly projecting portions 156 corresponding to the number of slots 154. Rearwardly projecting portions 156 may be configured to extend slots 154 beyond an internal length of central bore 146 in cartridge 116, such that a sealant receiving chamber 158 is formed between rearwardly projecting portions 156. Upon assembly, sealant receiving chamber 158 is positioned between electrical cable conductors 182 (two of which are shown in FIG. 1B) received within slots 154. As described below, sealant receiving chamber 158 allows for efficient distribution of sealing compound around and between the conductors during assembly of fitting 100.

Formed in a forward end of cartridge 116, sealant administration portion 150 may form a tube for administering a sealing compound (also referred to as a sealant) to sealant receiving chamber 158 via central bore 146. In some embodiments, as shown in FIG. 2A, an outside diameter of sealant administration portion 150 may be sized so as to align with a radially inward portion of slots 154, thereby allowing electrical cable conductors 182 received within slots 154 to lay substantially flat against sealant administration portion 150.

Although four slots are shown in FIGS. 2A and 2B, it should be understood that any suitable number of slots for receiving a corresponding number of electrical cable conductors may be provided in cartridge 116. In this manner, sealing cartridge 116 may provide a modular mechanism for handling electrical cables having different numbers of conductors in a common fitting design.

Figure 3B:
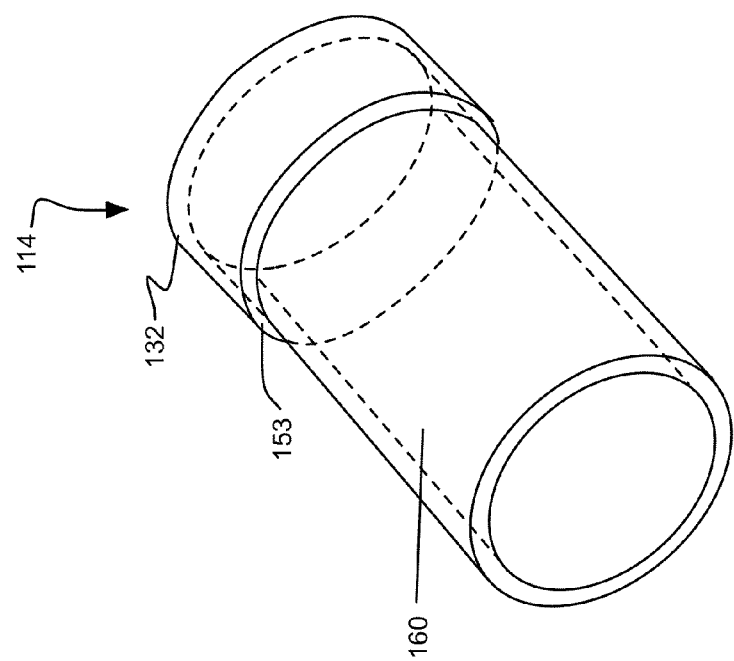
FIGS. 3A and 3B are rear and front isometric views, respectively, of an exemplary sealing sleeve of FIG. 1A.
Figure 3A:
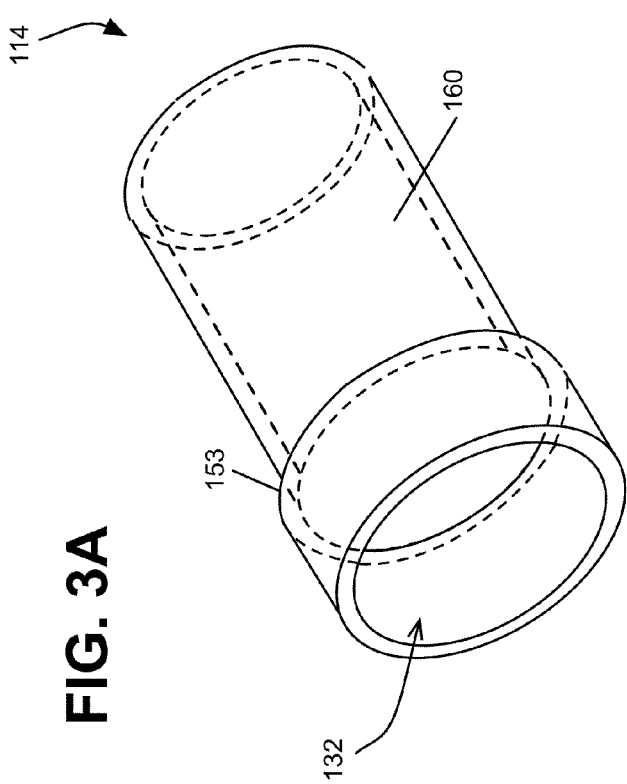

FIGS. 3A and 3B are rear and front isometric views of an exemplary sealing sleeve 114. As shown, in FIGS. 1A, 3A, and 3B, sealing sleeve 114 may include rearward end 132 and a forward end 160 having a tubular configuration. Rearward end 132 may include a shoulder portion 153 having larger inside and outside diameters relative to the remainder of sealing sleeve 114, as described above. In one embodiment, an inside diameter of shoulder portion 153 may be sized to receive annular shoulder 152 in cartridge 116. As described briefly above, annular groove 144 in internal tubular portion 142 of body 102 may receive rearward end 146 of sealing sleeve 114. In some implementations, an axial length of shoulder portion 150 may be sized substantially similarly to an axial distance from conductor egressing end 126 of body 102 and a rearwardmost portion of annular groove 144.

Consistent with embodiments described herein, an inside diameter of forward end 160 of sealing sleeve 114 may be substantially similar to an outside diameter of conductor separating portion 148 of sealing cartridge 116, such that sealing sleeve 114 may axially receive sealing cartridge 116 upon placement of electrical cable conductors 182 within slots 154.

During assembly, electrical cable conductors 182 may be inserted through tubular bore 140 in integrated sealing barrier 138 and positioned within slots 154 in sealing cartridge 116. Cartridge 116 may be seated within sealing sleeve 114 and sealing sleeve 114 may then be axially received within annular groove 144 in internal tubular portion 142 of body 102. In some implementations, fitting 100 may be positioned vertically during assembly, such that sealing sleeve 114 and conductors 182 project upwardly from body 102. Sealing compound 184 (shown in a checkerboard pattern in FIG. 1B) may be inserted or injected into central bore 146 via sealant administration portion 150 and allowed to flow into sealant receiving chamber 158, abut sealing barrier 138 and, and flow around and between electrical cable conductors 182 received within slots 154 while filling sealing sleeve 114. The vertical orientation of fitting 100 provides a gravity assisted flow of sealing compound 184.

Consistent with embodiments described herein, each of sealing sleeve 114 and sealing cartridge 116 may be formed of a transparent material, such as a transparent plastic, to allow visible confirmation that complete distribution of the sealing compound between and around conductors 182 has been accomplished. Following visual confirmation of such distribution, the body 102 may be secured between hub nut 118 and the main nut 104.

Returning to FIG. 1A, grounding element 106 may be configured for positioning within cable receiving portion 122 of body 102 and may include a substantially annular configuration and a number of axially extending resilient contact fingers 162, as shown in FIGS. 4A and 4B. In the embodiment shown in FIGS. 1A and 1B, grounding element 106 includes five contact fingers 162, although any suitable number of contact fingers 162 may be provided. In the manner described below, upon threading main nut 104 onto body 102 (as described below), contact fingers 162 may be deflected inwardly by first angled annular portion 136 in central bore 134. This deflection causes contact fingers 162 to engage a metallic sheath/cladding of the electrical cable. Such engagement provides mechanical and electrical contact with the outer cladding of cable 180 inserted into body 102 and main nut 104.

FIGS. 4A and 4B illustrate a front view and side view, respectively, of grounding element 106 consistent with implementations described herein. As shown, grounding element 106 may include a substantially annular body 402 defining a central opening 404. A number of contact fingers 162 may extend from annular body 402 in a radially spaced configuration. As shown, contact fingers 162 may project inwardly toward central opening 404.

As shown in FIG. 4B each of contact fingers 162 may include a substantially curved end portion 408 and a proximal region 410 connected to annular body 402. Curved end portions 408 may be configured to engage an outer surface of the metallic sheath of an electrical cable. In some implementations, the relative thickness of proximal region 410 may be reduced relative to a remainder of each contact finger 162. Additionally, each of contact fingers 162 may include a generally planar octagonal shape with the curved end portions 408 bent inwardly toward central opening 404. The octagonal shape of each contact finger 162 may provide tapered side walls configured to engage angled portion 136 of central bore 134 upon urging of grounding element 106 toward conductor egressing end 126 of body 102. Although FIGS. 1A, 1B, 4A, and 4B depict a grounding element 106 having a number of projecting contact fingers 162, in other implementations, suitable grounding elements may include other configurations, such as a helical or spring-like configuration, etc.

Returning to FIG. 1A, main nut 104 may include an elongate hollow generally tubular member having a rearward cable receiving end 164, an intermediate portion 166, and a forward end 168. As shown, rearward cable receiving end 164, intermediate portion 166, and forward end 168 may be formed in a substantially annularly notched configuration, such that rearward cable receiving end 164 has smaller inside and outside diameters than intermediate portion 166, and intermediate portion 166 has smaller inside and outside diameters than forward end 168. For example, an inside diameter of rearward cable receiving end 164 may be sized to accommodate a metallic sheath/cladding of electrical cable 180 inserted therethrough. An inside diameter of intermediate portion 166 may be sized to accommodate cable receiving end 122 of body 102, as shown in FIG. 1B. A shoulder 170 may be formed at an internal transition between rearward cable receiving end 164, intermediate portion 166. As shown in FIG. 1B, shoulder 170 may engage annular body 402 of grounding element 106 upon engagement of main nut 104 with hub nut 118, as described below.

In one embodiment, rearward cable receiving end 164 may include external threads 172 formed thereon for engaging internal threads 174 in gland nut 112. Additionally, an axial length of intermediate portion 166 may provide an area for marking certifications and branding. A forward portion of intermediate portion 166 may be provided with internal threads 129 for engaging external threads 128 in body 102 during an intermediate assembly of fitting 100. For example, when fitting 100 is assembled such that threads 128 engage threads 129, grounding element 106 may be in an uncompressed state, thereby allowing electrical cable 180 to be inserted into fitting and yet maintain body in a retained relationship with respect to main nut 104.

Forward end 168 of main nut 104 may include a tool engaging outer surface 176. For example, outer surface 176 may include a hexagonal configuration on at least a portion thereof for engaging a torque applying tool, such as a wrench. In other implementations, other engagement surfaces may be used, such as knurling, notching, etc. Forward end 168 may include internal threads 178 for engaging external threads 186 provided on a rearward end 188 of hub nut 118, during final assembly of fitting 100, as described below.

Hub nut 118 may include an elongate hollow generally tubular member that includes rearward end 188, an intermediate portion 190, and a forward end 191. As shown, rearward cable receiving end 188, intermediate portion 190, and forward end 191 may be formed in a substantially annularly notched configuration, such that rearward end 188 has a larger inside diameter than intermediate portion 190, and intermediate portion 190 has larger inside diameter than forward end 191.

As described above, rearward end 188 includes external threads 186 for engaging internal threads 178 in main nut 104. Additionally, as shown in FIGS. 1A and 1B, inside diameter of rearward end 188 may include annular rib 192 positioned to correspond with annular rib 135 in body 102 to engage O-ring 120 during assembly.

Intermediate portion 190 of hub nut 118 may include an inside diameter sized to accommodate forward end 126 of body 102. Further, intermediate portion 190 may include an outer tool engagement surface, such as a hexagonal configuration for engaging a tool during tightening of hub nut 118 relative to main nut 104 or on a housing or other structure (not shown) for receiving fitting 100.

Forward end 191 of hub nut 118 may include an inside diameter sized to accommodate sealing sleeve 114, as shown in FIG. 1B. For example, following distribution of sealing compound 184 within sealing sleeve 114, hub nut 118 may be slid along conductors 182 and onto body 102. External threads 186 in hub nut 118 may then engage internal threads 178 in main nut 104 to secure body 102 and main nut 104 to hub nut 118.

Tightening of main nut 104 relative to hub nut 118 (e.g., by engaging both tool engaging surface on intermediate portion 190 and tool engagement 176 on main nut 104) may cause compression/engagement of grounding element 106 onto cable 180, thereby securing cable 180 within fitting 100. Such engagement may further cause O-ring 120 to be compressed between flange 133 and annular ribs 135/192 thereby effecting a liquid-proof seal between hub nut 118 and body 102.

As shown in FIGS. 1A and 1B, forward end 191 of hub nut 118 may further include external threads 193 formed on an outer surface thereof for engaging corresponding threads in a housing (e.g., junction box, transformer, etc.) or other structure for receiving fitting 100.

Returning to gland nut 112, as described briefly above, internal threads 174 in gland nut 112 may engage external threads 172 in main nut 104 to secure compression bushing 108 and cap guide 110 within fitting 100. As shown in FIGS. 1A and 1B, gland nut 112 may include a substantially tubular configuration having an forwardly angled inner surface 194 for engaging cap guide 110 and compression bushing 108 and urging them toward main nut 104 upon tightening of gland nut relative to main nut 104, e.g., via an outer tool engaging surface 195 on gland nut 112.

In one implementation, compression bushing 108 may include a substantially frustoconically-shaped elastomeric material having a bore 196 therethrough. The frustoconical shape may be configured to engage angled surface 194 in gland nut 112. Upon compression between gland nut 112 and main nut 104, an internal diameter of bore 196 may shrink. Thus, when cable 180 has been received within gland nut 112, bushing 108, and main nut 104, compression of bushing 108 may seal and secure cable 180 within fitting 100. By virtue of its elastomeric material, bushing 108 may adapt to retain cables having a variety of sizes.

Figure 5B:
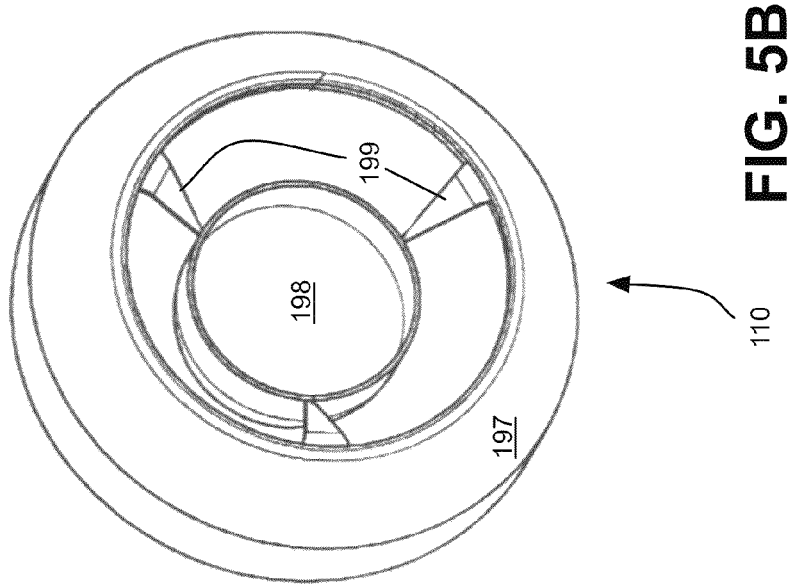
FIGS. 5A and 5B are front and rear isometric views, respectively, of an exemplary cap guide ring of FIG. 1A.
Figure 5A:
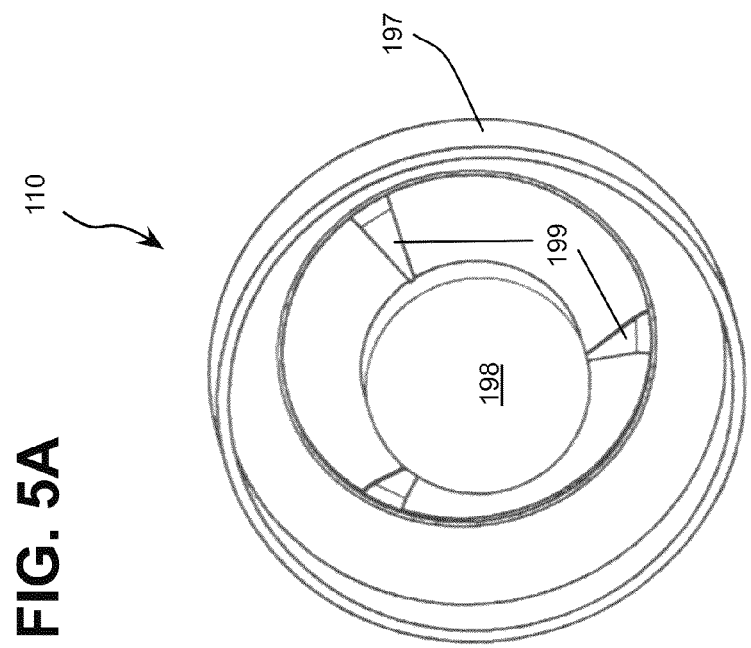

Consistent with implementations described herein, cap guide 110 may include an annular ring 197 and a cup-shaped portion 198 coupled to annular ring 197 via a number of break-away or detachable spokes 199. FIGS. 5A and 5B are front and rear isometric views, respectively, of an exemplary cap guide 110. As shown, in FIG. 5B, a rearward surface 500 of cap guide 110 may include an angled configured corresponding to angled inner surface 194 of gland nut 112 and also to the frustoconical shape of compression bushing 108. In this manner, upon initial assembly of gland nut 112 to main nut 104 (e.g. via corresponding threads 172/174), cap guide 110 may be secured within fitting.

Cup-shaped portion 198 may be configured to receive an end of conductors 182 as conductors 182 are introduced into fitting 100. During assembly, cable 180 may be pushed or inserted into fitting 100 and causing conductors 182 to enter cup-shaped portion 198 of cap guide 110. Continued urging of cable 180 into fitting 100 causes cup-shaped portion 198 to break away from annular ring 197. That is, spokes 199 may break off of cup-shaped portion 198, thus allowing cup-shaped portion 198 to precede conductors 182 through fitting 100.

Cup-shaped portion 198 may continue to engage the ends of conductors 182, as cable 180 is pushed through grounding element 106, body 102, and sealing barrier 138. In this manner, conductors 182 are prevented from splaying away from an axial orientation of cable 180 and potentially becoming stuck within body 102, such as by engaging a rearward end of sealing barrier 138. Moreover, cup-shaped portion 198 provides a solid engagement surface for enabling easy insertion of cable 180 through barrier 138. After fully inserting cable 180 into fitting 100, cup-shaped portion 198 may be removed and discarded.

Figure 6A:
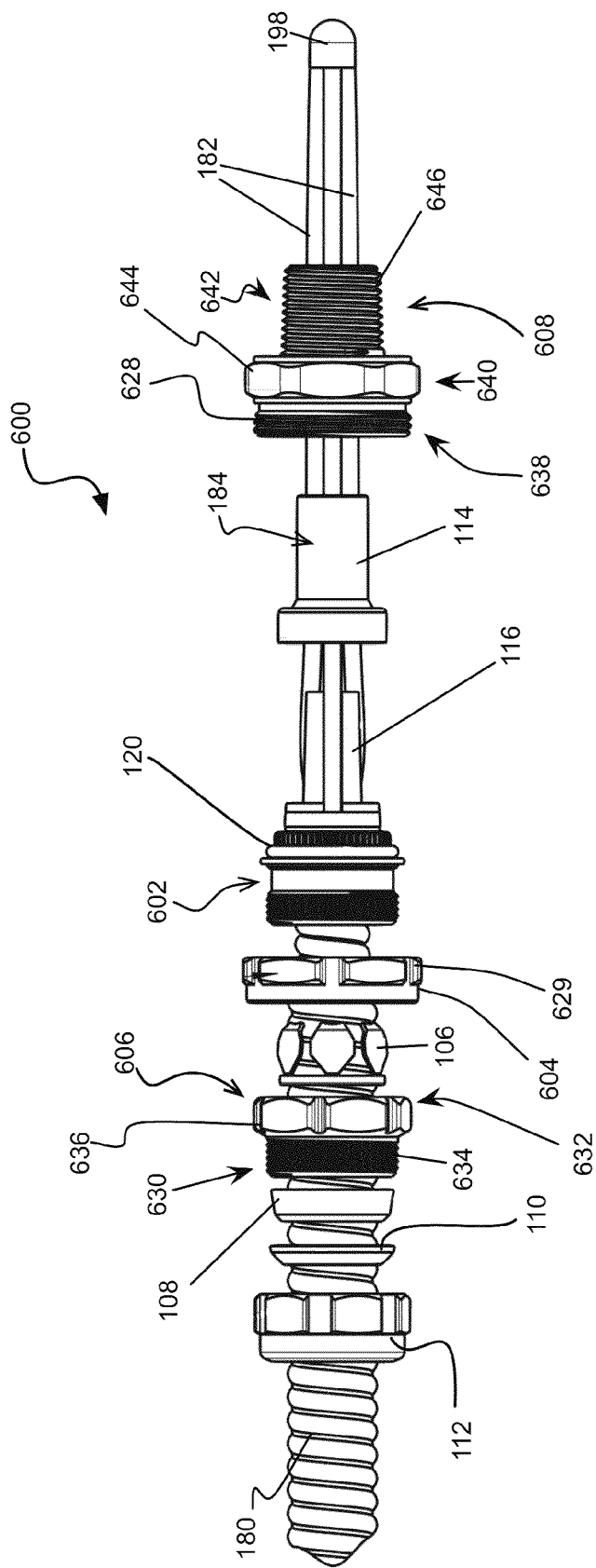
FIGS. 6A and 6B are exploded side and isometric views, respectively, of an alternative explosion-resistant fitting consistent with implementations described herein.
Figure 6B:
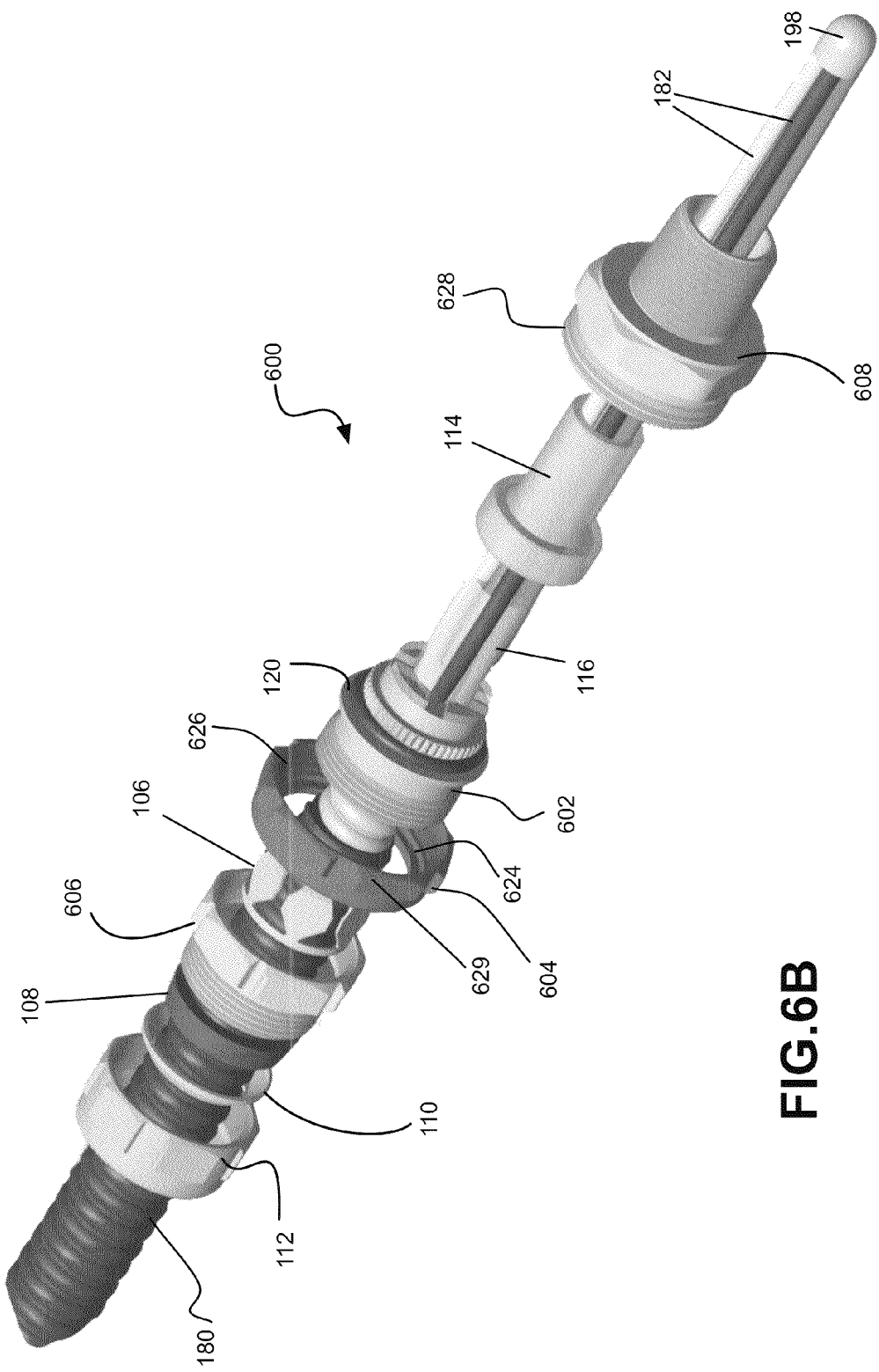
Figure 6C:
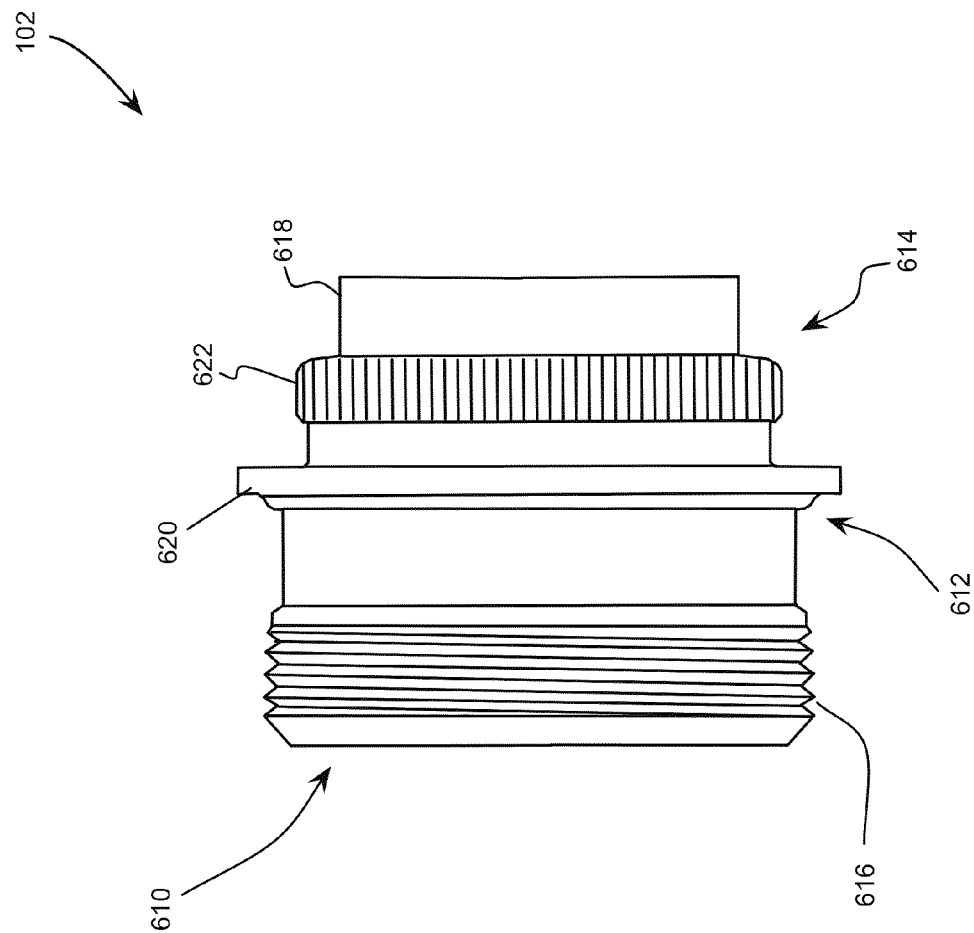
FIG. 6C is an isometric view of the fitting of FIG. 6A in a partially assembled configuration.

FIGS. 6A and 6B are exploded side and isometric views, respectively, of an explosion-resistant fitting 600 consistent with an alternative configuration described herein. FIG. 6C is a side view of body 602. FIG. 6D is an isometric view of fitting 600 in a partially assembled configuration. FIG. 6E is an isometric view of fitting 600 in an assembled configuration. Where appropriate, the same numbers may be used to described the similar elements described above with respect to FIGS. 1A to 5B. As shown, fitting 600 may include a body 602, coupler nut 604, a main nut 606, grounding element 106, compression bushing 108, cap guide 110, gland nut 112, a sealing sleeve 114, sealing cartridge 116, a hub nut 608, and O-ring 120.

Referring to FIG. 6C, body 602 may include an elongated hollow generally tubular member having an enlarged cable receiving end 610, an intermediate portion 612, and conductor egressing end 614 opposing cable receiving end 610. Cable receiving end 610 may include external threads 616 formed thereon for engaging internal threads 617 in main nut 606 in the manner described below. Conductor egressing end 614 may include a sleeve engaging portion 618 configured to engage a rearward end 132 of sealing sleeve 114 during assembly of fitting 600. For example, sleeve engaging portion 618 may be sized to be received within a rearward portion of sealing sleeve 114.

Intermediate portion 612 may include an external annular flange 620 projecting radially therefrom. As described below, flange 620 may engage a coupler nut 604 and act as a positive stop during assembly of body 602 to hub nut 608. Further, intermediate portion 612 may include a radially projecting splined annular portion 622. Splined annular portion 622 may serve a dual purpose during the assembly of fitting 600. For example, flange 620 and splined annular portion 622 may together engage O-ring 120 to provide seal fitting 100 from outside environmental moisture. In addition, the splined or notched configuration of splined annular portion 622 may engage corresponding or mating splines in an inside diameter of hub nut 608, thereby maintaining hub nut 608 and body 602 in rotationally fixed relationship with respect to each other following assembly of hub nut 608 to coupler nut 604. In other words, the splined nature of splined annular portion 622 and hub nut 608 may prevent hub nut 608 from spinning relative to body 602 after assembly.

Although not shown in FIG. 6C, body 602 may include an internal central bore and integrated sealing barrier similar to central bore 134 and sealing barrier 138 described above with respect to FIGS. 3A and 4A. The central bore of body 602 may also include an angled annular portion similar to angled portion 136 for engaging grounding element 106.

In one implementation, sealing sleeve 114 and sealing cartridge 116 may be configured substantially similar to those described above with respect to FIGS. 1A-3B. That is, sealing cartridge 116 may have a generally tubular configuration to be received within sealing sleeve 114 and may include a central bore formed therethrough, and conductor separating portion 148, and a sealant administration portion (not shown in FIG. 6). Conductor separating portion 148 may include an annular shoulder 152 and a number of radially spaced conductor maintaining notches or slots 154 formed axially in a periphery of conductor spacing portion 148. In some implementations, as shown in FIG. 6A, radially spaced conductor maintaining notches or slots 154 may extend along an entire length of cartridge 116, with sealant administration portion formed as a tube formed radially inwardly of conductor maintaining notches or slots 154.

During assembly, electrical cable conductors 182 may be inserted through body 602 and positioned within slots 154 in sealing cartridge 116, as shown in FIG. 6B. Cartridge 116 may be seated within sleeve 114 and sealing sleeve 114 may then axially receive sleeve engaging portion 618 of body 602. In some implementations, fitting 100 may be positioned vertically during assembly, such that sealing sleeve 114 and conductors 182 project upwardly from body 602. Sealing compound is then inserted or injected into sealant administration portion in cartridge 116 and allowed to flow through and between electrical cable conductors 182 received within slots 154 while filling sealing sleeve 114. The vertical orientation of fitting 100 provides a gravity assisted flow of sealing compound 184.

Returning to FIGS. 6A and 6B, grounding element 106 may be configured as described above with respect to FIGS. 4A and 4B and may be positioned within cable receiving portion 610 of body 602. Coupler nut 604 may include a generally tubular configuration adapter to fit over body 602. As shown in FIG. 6B, coupler nut 604 may include a rearward shoulder portion 624 for abutting a rearward surface of flange 620 in body 602 during assembly of fitting 600. Forward portion of coupler nut 604 may include internal threads 626 formed thereon for engaging external threads 628 in a rearward portion of hub nut 608. Coupler nut 604 may include a hexagonal or other tool engaging surface 629 for use in tightening coupler nut 604 to hub nut 608, effectively securing body 602 therebetween, as shown in FIG. 6E.

Main nut 606 may include an elongate hollow generally tubular member having a rearward cable receiving end 630, and a forward end 632. As shown, rearward end 630 and forward end 632 may be formed similarly to rearward end 164 and intermediate portion 166 of main nut 104 described above. That is, rearward end 630 may have a smaller inside and outside diameter than forward end 632. An inside diameter of rearward end 630 may be sized to accommodate a metallic sheath/cladding of electrical cable 180 inserted therethrough. In one embodiment, rearward end 630 may include external threads 634 formed thereon for engaging internal threads 174 in gland nut 112.

Further, an inside diameter of forward end 632 may be sized to accommodate cable receiving end 610 of body 602. As described above, during assembly, internal threads 607 in forward end 632 of main nut 606 may engage external threads 616 in cable receiving end 610 of body 602. Forward end 632 of main nut 104 may include a tool engaging outer surface 636. For example, outer surface 636 may include a hexagonal configuration on at least a portion thereof for engaging a torque applying tool, such as a wrench. In other implementations, other engagement surfaces may be used, such as knurling, notching, etc.

Consistent with embodiments described herein, gland nut 112, compression bushing 108 and cap guide 110 may be substantially similar to those described above in relation to FIGS. 1A and 1B. For example, internal threads 174 in gland nut 112 may engage external threads 634 in main nut 606 to secure compression bushing 108 and cap guide 110 within fitting 100, as shown in FIG. 6E.

Hub nut 608 may include an elongated hollow generally tubular member that includes rearward end 638, an intermediate portion 640, and a forward end 642. In one embodiment, rearward cable receiving end 638, intermediate portion 640, and forward end 642 may be formed in a substantially annularly notched configuration, such that rearward end 638 has a larger inside diameter than intermediate portion 640, and intermediate portion 640 has larger inside diameter than forward end 642.

Figure 11D:
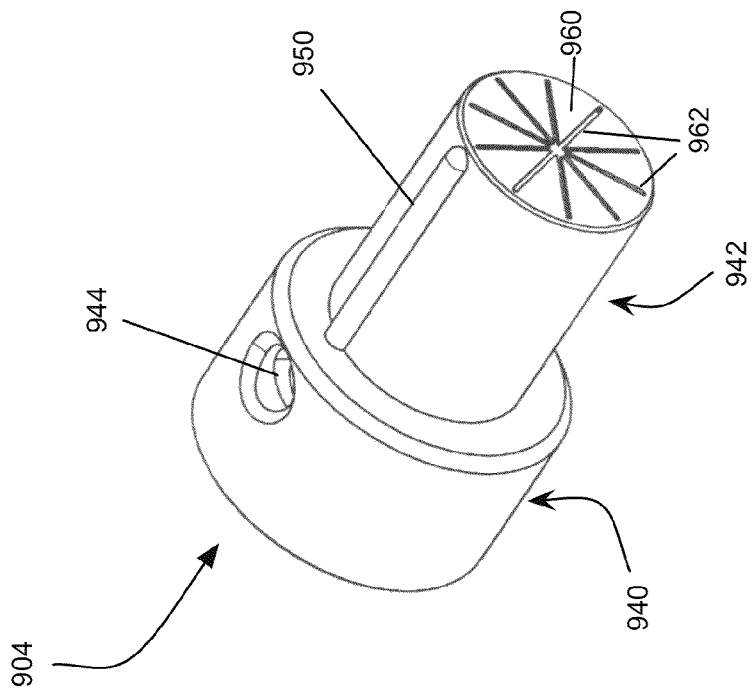
FIG. 11D is a front isometric view of a second embodiment of the sealing sleeve of FIG. 9.
Figure 11C:
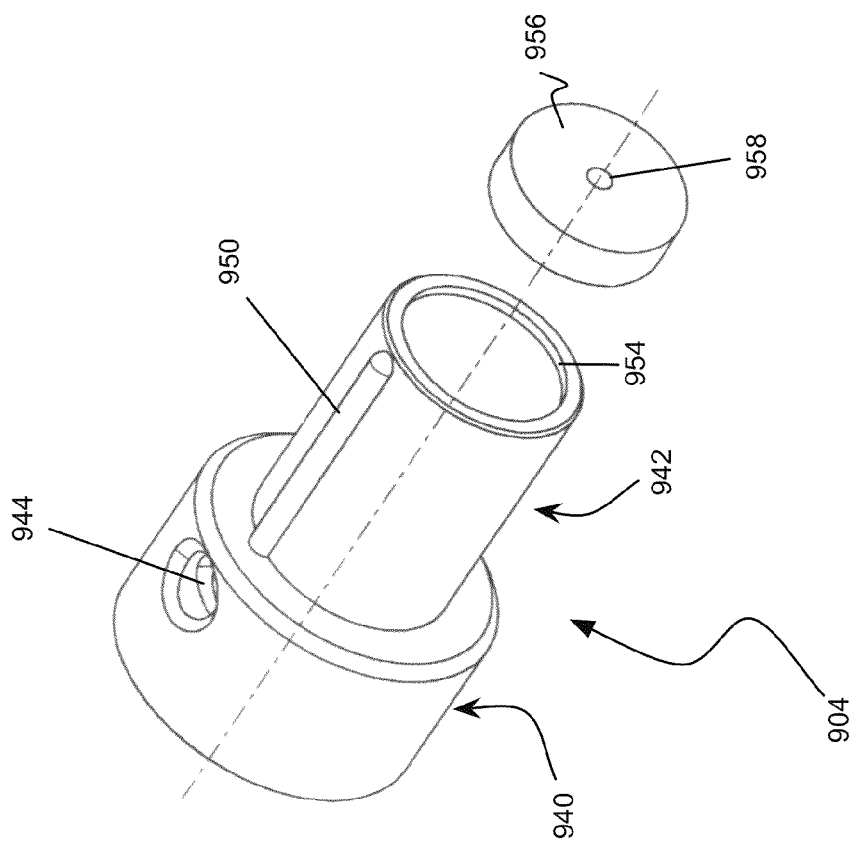
FIG. 11C is a front isometric view of one embodiment of the sealing sleeve of FIG. 9.
Figure 11E:
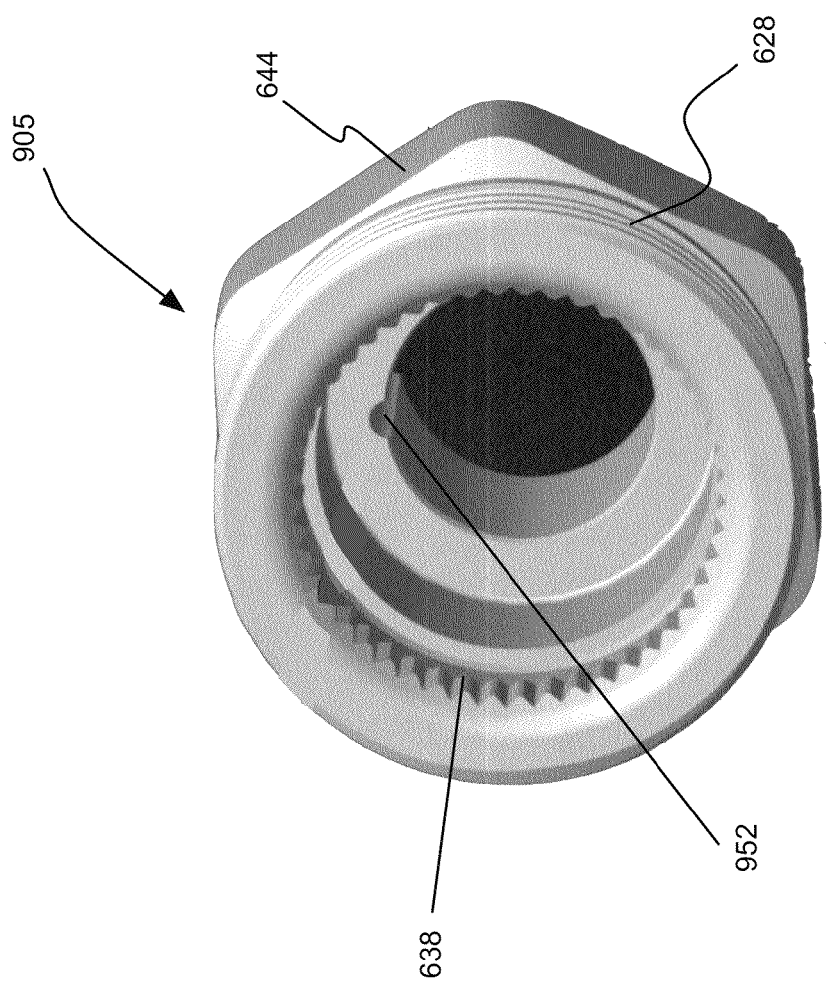
FIG. 11E is a rear isometric view of a hub nut of configured for use with the body and sealing sleeve of FIG. 9.

As described briefly above, rearward end 638 of hub nut 608 may include external threads 628 for engaging internal threads 626 in coupler nut 104. Additionally, in one embodiment, an inside surface of rearward end 638 may include a splined or notched configuration corresponding to splined annular portion 622 in body 602 for engaging splined annular portion 622 during assembly of fitting 600. An example of such a splined configuration is shown in FIG. 11E, described below.

Intermediate portion 640 of hub nut 608 may include an outer tool engaging surface 644, such as a hexagonal configuration for engaging a tool during tightening of hub nut 608 relative to coupler nut 104 or on a housing or other structure (not shown) for receiving fitting 100.

Forward end 642 of hub nut 118 may include an inside diameter sized to accommodate sealing sleeve 114. For example, following distribution of the sealing compound within sealing sleeve 114, hub nut 608 may be slid along conductors 182 and onto body 602. External threads 628 in hub nut 608 may then engage internal threads 626 in coupler nut 604 to secure body 602 and coupler nut 604 to hub nut 608.

Tightening of main nut 606 relative to body 602 (e.g., by engaging tool engaging outer surface 636 on main nut 606) may cause compression/engagement of grounding element 106 onto cable 180, thereby securing cable 180 within fitting 100. Such engagement may further cause O-ring 120 to be compressed between flange 133 and annular ribs 135/192 thereby effecting a liquid-proof seal between hub nut 608 and body 602.

As shown in FIGS. 6A, 6B, and 6E, forward end 642 of hub nut 608 may further include external threads 646 formed on an outer surface thereof for engaging corresponding threads in a housing (e.g., junction box, transformer, etc.) or other structure for receiving fitting 100.

Figure 7B:
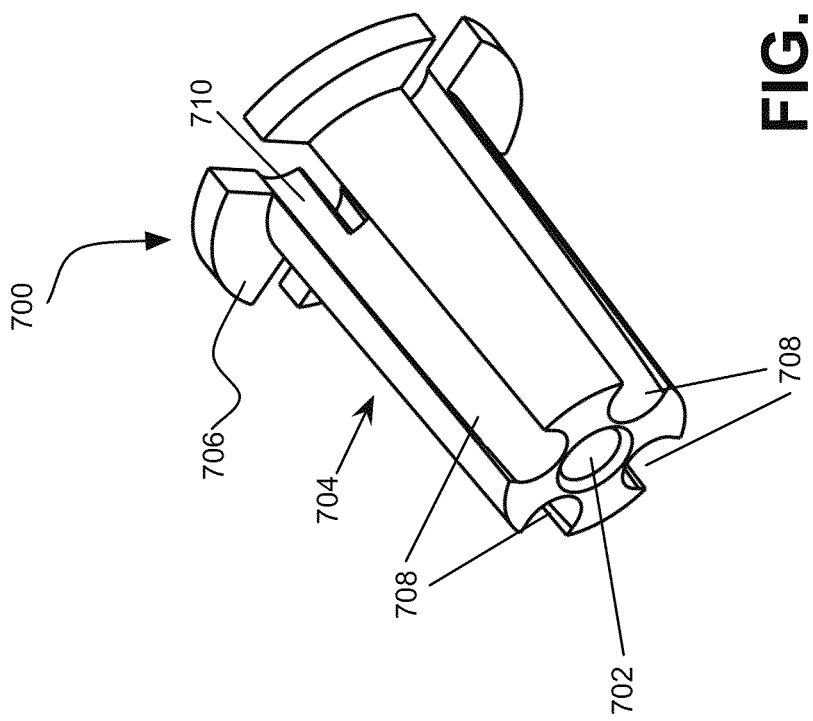
FIGS. 7A and 7B are rear and front isomeric views, respectively, an alternative sealing cartridge consistent with implementations described herein.
Figure 7A:
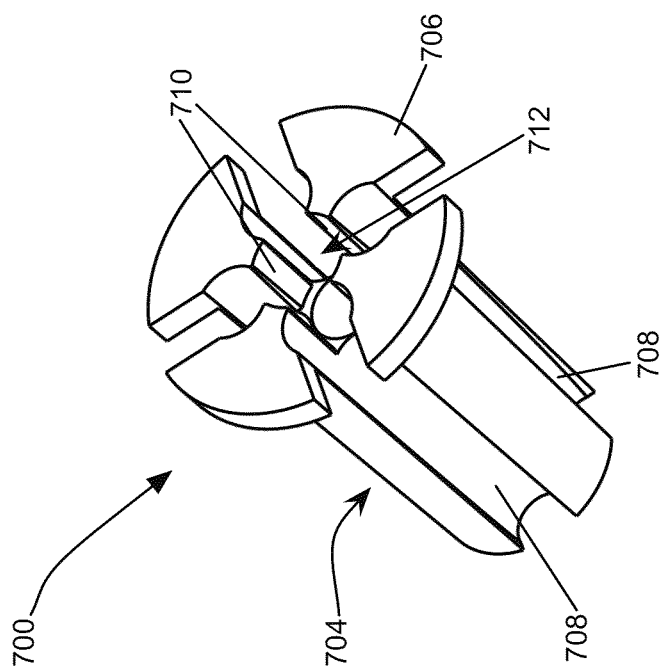

FIGS. 7A and 7B are rear and front isomeric views, respectively, an alternative sealing cartridge 700. As shown, sealing cartridge 700 may have a generally tubular configuration to be received within sealing sleeve 114. Sealing cartridge 700 may include a central bore 702 formed therethrough and may include a number of conductor separating portions 704 formed in an outer periphery thereof. Conductor separating portions 704 may include an annular shoulder 706 and a number of radially spaced conductor maintaining notches or slots 708 formed axially in a periphery of cartridge 700.

In one implementation, annular shoulder 706 is formed at a rearward end of cartridge 700 and may be configured to engage a corresponding shoulder portion 153 in sealing sleeve 114, during insertion of sealing cartridge 116 into sealing sleeve 114, as described above with respect to FIGS. 1A and 1B. As shown in FIG. 7A, in one embodiment, slots 708 may having a generally cylindrical configuration, although other non-cylindrical shapes or cross-sections may also be used. Additionally, as shown in FIG. 7A, conductor separating portion 704 may include a number of rearwardly projecting portions 710 corresponding to the number of slots 708. Rearwardly projecting portions 710 may be configured to extend slots 708 beyond an internal length of central bore 702 in cartridge 700, such that a sealant receiving chamber 712 is formed between rearwardly projecting portions 710. Sealant receiving chamber 712 allows for efficient distribution of sealing compound around and between the conductors during assembly of fitting 100/600 when the sealing compound is directed through central bore 702.

FIGS. 8A and 8B are rear and front isometric views, respectively, of another exemplary sealing cartridge 800. As shown, sealing cartridge 800 may include seven slots 708 and rearwardly projecting portions 710 for accommodating an electrical cable having seven conductors.

Figure 9:
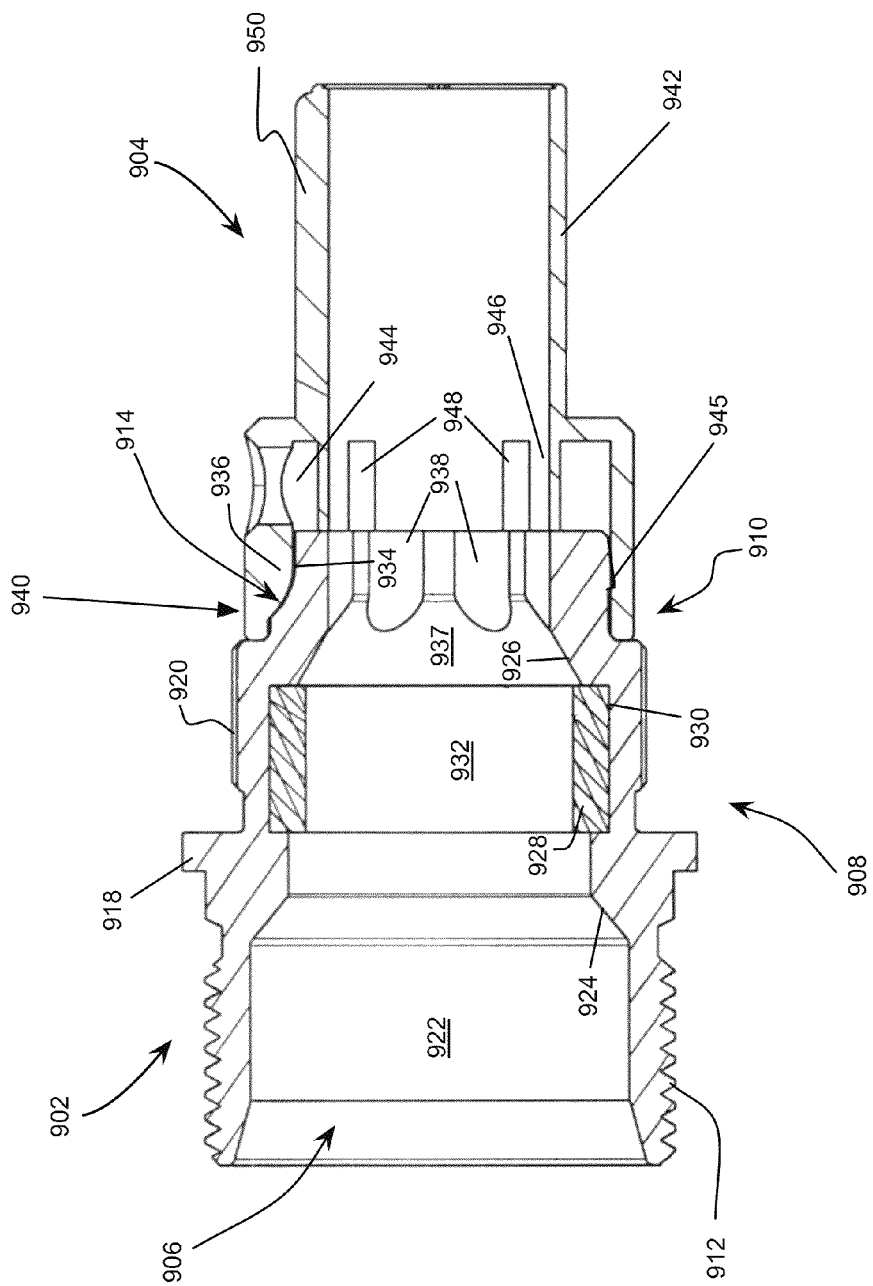
FIG. 9 is a cross-sectional view of an alternative configuration of the body and sealing sleeve of FIG. 6A.
Figure 10:
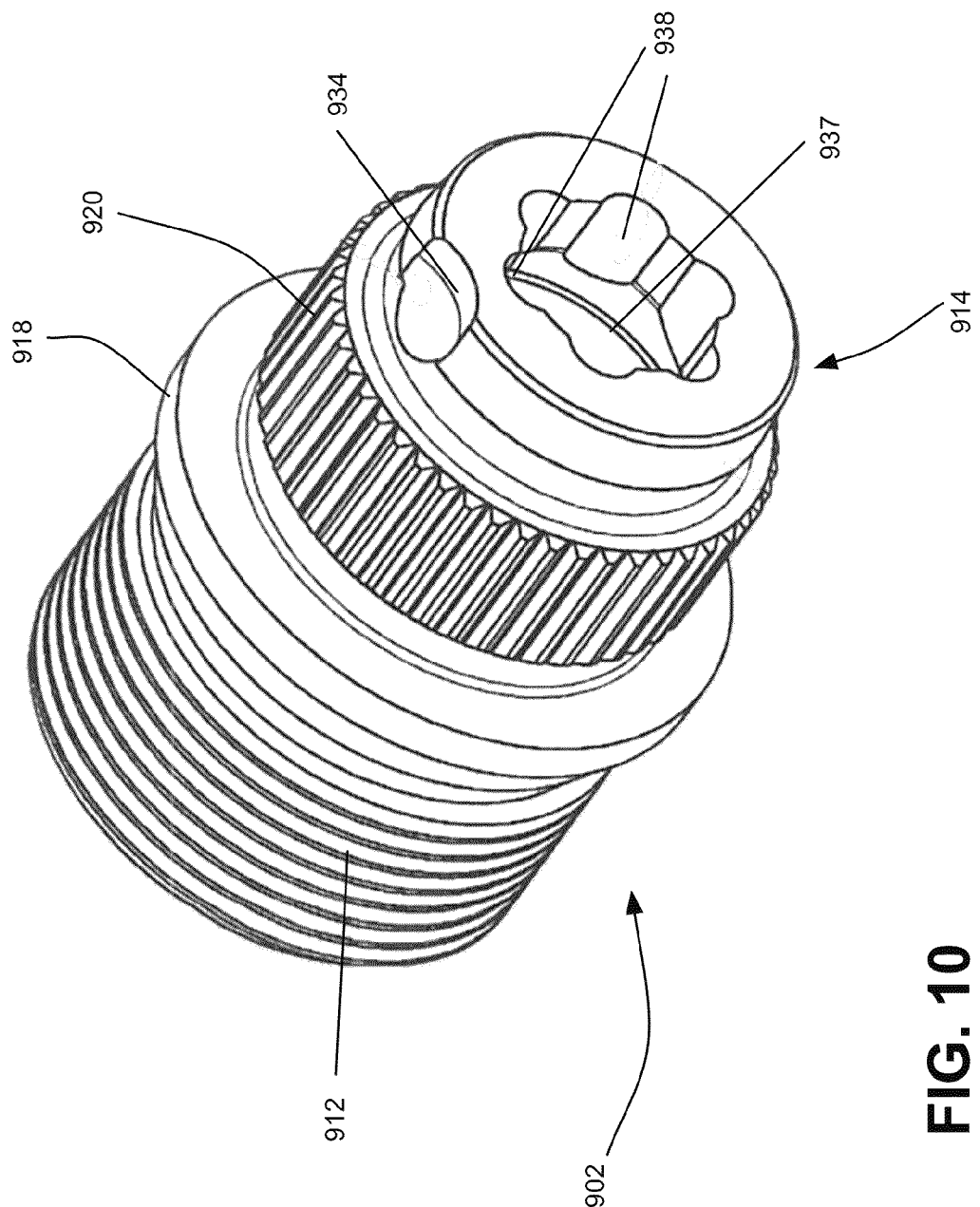
FIG. 10 is a front isometric view of the body of FIG. 9.

FIG. 9 is a cross-sectional view of a portion of a fitting 600 that includes an alternative body 902 and sealing sleeve 904. FIG. 10 is a front isometric view of body 902. FIGS. 11A and 11B are front and rear isometric views, respectively, of an exemplary sealing sleeve 904. FIG. 11C is a front isometric view of a first embodiment of sealing sleeve 904. FIG. 11D is a front isometric view of a second embodiment of sealing sleeve 904. FIG. 11E is a rear isometric view of a hub 905 configured for use with sleeve 904 described below. Consistent with implementations described herein, body 902 and/or sleeve 904 may be incorporated into fitting 600 described above. As described below, the configuration of sealing sleeve 904 may enable distribution of a sealing compound between conductors 182 without requiring a sealing cartridge, such as sealing cartridge 116 described above.

As shown in FIG. 9, body 902 may include an elongate hollow generally tubular member having an enlarged cable receiving end 906, an intermediate portion 908, and a smaller conductor egressing end 910 opposing cable receiving end 906. Cable receiving end 906 may include external threads 912 formed thereon for engaging internal threads 634 in main nut 606 as described above in relation to FIG. 6. Conductor egressing end 910 may include a sleeve receiving portion 914 configured to engage a rearward end 916 of sealing sleeve 904 during assembly of fitting 600.

An external annular flange 918 similar to flange 620 described above may be provided on intermediate portion 908 of body 902. Further, intermediate portion 908 may include a radially projecting splined annular portion 920 similar to splined annular portion 622 described above.

Body 902 may include an internal central bore 922 extending along a central longitudinal axis between cable receiving end 906 and conductor egressing end 908. In one embodiment, central bore 922 may include a first angled annular portion 924 for engaging a grounding element, such as grounding element 106 and a second angled annular portion 926, positioned forwardly of first angled annular portion 924, for engaging urging conductors 182 of cable 180 toward forward end 910 of body 902. As shown in FIG. 9, central bore 922 may include an annular notch 930 for receiving sealing barrier 928.

Integrated sealing barrier 928 may include a tubular bore 932 formed therein for resiliently receiving a portion of an electrical cable inserted through body 902. In some implementations, sealing barrier 928 may be formed of a resilient material, such as latex, rubber, etc. or another polymer/elastomer. As described below, during assembly of fitting 600, sealing barrier 928 may engage inserted electrical cable 180 and prevent the injected or distributed sealing compound from flowing into a portion of body 902 and fitting 600 rearward of barrier 928. In some embodiments, sealing barrier 928 may be formed or positioned with body 902 prior to assembly of fitting 600, e.g., during the manufacture of fitting 600.

As shown in FIG. 10, sleeve receiving portion 914 of body 902 may be sized to be received within a rearward tubular portion of sealing sleeve 904. Sleeve receiving portion 914 may further include a notch or detent 934 formed in an outer periphery thereof. As shown in FIG. 9, notch 934 may engage a corresponding projection 936 in sealing sleeve 904, such that sealing sleeve 904 may be rotationally fixed relative to body 902 upon assembly of fitting 600. In some embodiments, the notch/projection configuration may be reversed, with body 902 including a projection and sleeve 904 including a corresponding notch.

As shown in FIG. 10, sleeve receiving portion 914 may include an internal bore 937 that includes a number of grooves 938 or channels formed therein. Grooves 938 may be configured to receive conductors 182 in a spaced configuration, such that sealing compound may flow between the conductors during assembly. Although six grooves 938 are shown in FIG. 10, any suitable number of grooves may be provided corresponding to a number of conductors 182 in an electrical cable 180.

As shown in FIG. 9, sealing sleeve 904 may include rearward end 940 and a forward end 942 having a generally tubular configuration. Rearward end 940 may include larger inside and outside diameters relative to the remainder of sealing sleeve 114. As described above, an internal surface of rearward end 940 may include projection 936 for engaging notch 934 in body 902. Further, as shown in FIGS. 11A and 11B, projection 936 may include a sealant delivery aperture 944 therethrough. As shown, sealant delivery aperture 944 may be positioned forwardly within projection 936 so as to not overlap conductor egressing end 910 in body 902 following placement of sleeve 904 on end 910.

In one implementation, as shown in FIG. 9, sleeve receiving portion 914 in body 902 may include an annular barb 945 formed about at least a portion of the periphery thereof. Barb 945 may engage a corresponding groove or detent in rearward portion 940 of sleeve 904 to assist in retaining sleeve 904 to body 902 during assembly.

In one exemplary implementation, rearward end 940 of sealing sleeve 904 may include a manifold portion 946 for facilitating even distribution of sealing compound within sleeve 904. For example, manifold portion 946 may include a thin walled tubular structure generally aligned within an inside diameter of forward end 942. Manifold portion 946 may project axially rearwardly from forward end 942, such that at least a portion of manifold portion 946 underlies sealant delivery aperture 944 in projection 936. Further, manifold portion 946 may include a number of axial slots or gates 948 formed radially therein. Upon delivery of sealing compound to sleeve 104 via aperture 944, the sealant may flow onto manifold portion 946, and around and through slots 948, thus distributing the compound through sleeve 904.

As shown in FIGS. 11C and 11D, an outer surface of forward end 942 may include an axial projection or keyed portion 950. Consistent with embodiments described herein, keyed portion 950 may be received within a corresponding keyed portion 952 in hub nut 905, as shown in FIG. 11E. Such a keyed relationship prevents rotation between hub nut 905 and sleeve 904 following assembly.

In one implementation, as shown in FIG. 11C, a forward end 942 of sleeve 904 may be provided with a lip 954 and a seal 956. Seal 956 may be formed of a resilient material, such as a latex or other rubber/elastomer, and may be configured to be placed or inserted within sleeve 904 prior to sleeve 904 receiving conductors 182. Seal 956 may include an outer diameter larger than an inner diameter of lip 954, thereby preventing seal 956 from passing past lip 954 following insertion. As shown, seal 956 may include a conductor aperture 958 formed axially therethrough. The resilient nature of seal 956 may allow aperture 958 to expand upon pressure from conductors 182. This allows conductors 182 to pass through seal 956 while maintaining a sealed relationship between seal 956 and conductors 182.

FIG. 11D shows an alternative configuration, in which forward end 942 of sealing sleeve 904 includes an end surface 960 having a number of radial slits 962 formed therein. Radial slits 962 allow end surface 960 to resilient receive conductors 182 and allow conductors 182 to pass therethrough, while maintaining a substantially sealed relationship.

In some implementations, it may be desirable to physically agitate or manipulate fitting 600 to effect uniform and thorough distribution of the sealing compound through sleeve 904 and, thus, between conductors 182. FIGS. 12A-12C are front and rear isometric, and cross-section views, respectively of such an arrangement. As shown, sleeve 904 may be placed within a vibration device 1200 prior to delivery of the sealing compound. Although not shown in FIGS. 12A-12C, it should be understood that prior to attachment of vibration device 1200, conductors 182 may be received within sleeve 904 and sleeve 904 may be positioned on body 902 in the manner described above.

As described above, sealing sleeve 904 may be formed of a transparent material, such as a transparent plastic, to allow visible confirmation that complete distribution of the sealing compound between and around conductors 182 has been accomplished. Following visual confirmation of such distribution, the body may be secured between the hub nut 905 and main nut 606.

As shown in FIGS. 12A-12C, vibration device 1200 may include a tubular portion configured to receive sleeve 904 therein. Vibration device 1200 may further include a sealant delivery aperture 1202 configured to align with sealant delivery aperture 944 in sealing sleeve 904. In one implementation, vibration device 1200 may be slid along conductors 182 and onto sleeve 904 after sleeve 904 engages body 904. Vibration device 1200 may be activated to vibrate fitting 900 and the sealing compound may be inserted into sleeve 904 via sealant delivery apertures 1202 and sealant delivery aperture 944. For example, vibration device 1200 may include an electrical (e.g., DC or battery powered) device that includes an electric vibration generator. The transparent nature of sleeve 904 may allow for visual inspection of the sealant distribution and, when it is determined that the sealant has been sufficiently distributed, vibration device 1200 may be removed and the remainder of fitting 600 (e.g., hub nut 905, etc.) may be assembled.

Figure 13A:
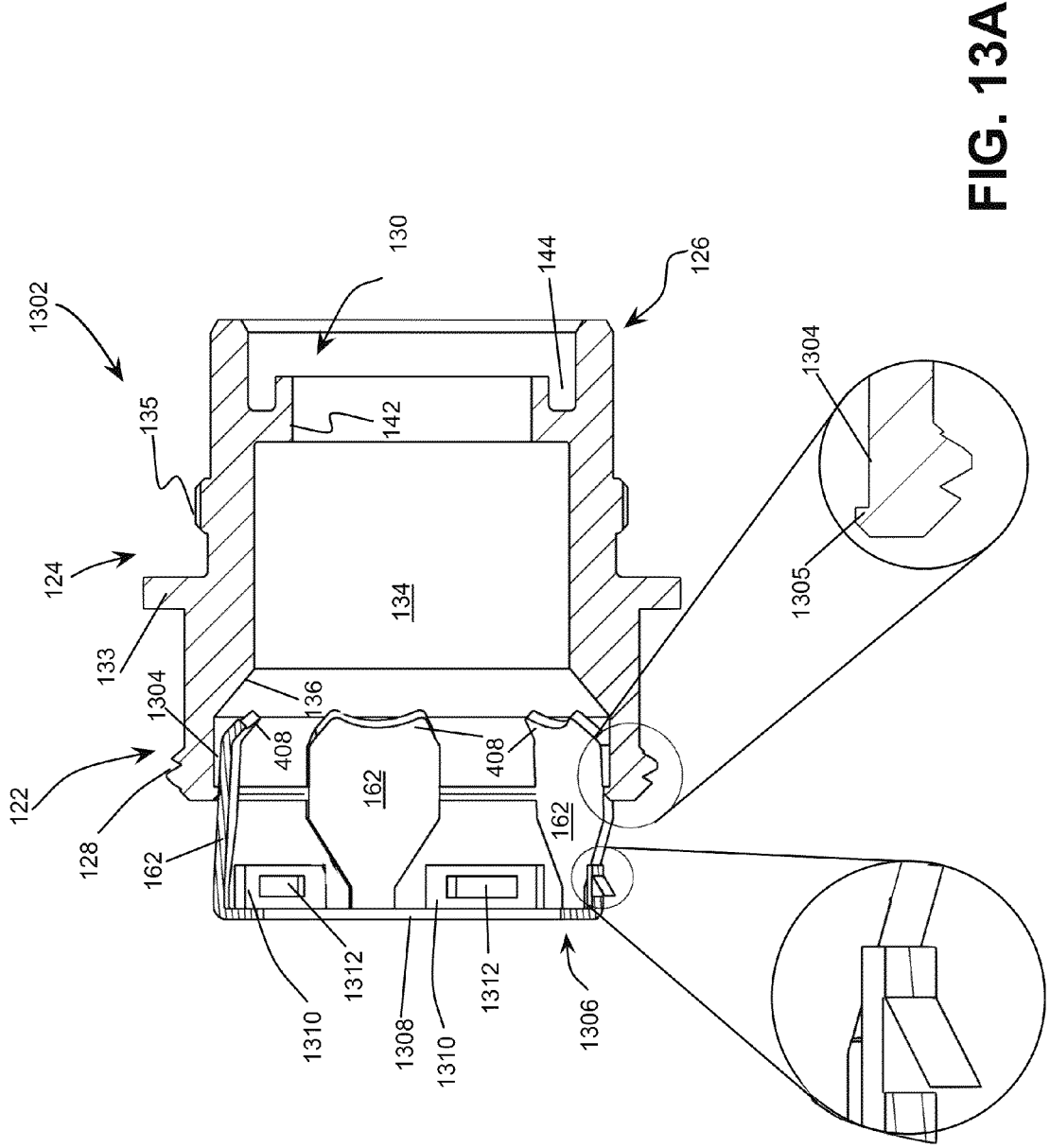
FIG. 13A is a cross-section view of another alternative configuration of the body and grounding element of FIG. 1A.

FIG. 13A is a cross-section view of a body 1302 and grounding element 1306 similar to body 102 and ground element 106 described above in relation to FIGS. 1A-1C and 4A-4B. Accordingly, where appropriate, similar reference numbers are used to described similar elements of body 1306 and grounding element 106.

As shown, body 1302 may include cable receiving end 122, intermediate portion 124, and conductor egressing end 126 opposing cable receiving end 122. Cable receiving end 122 may include external threads 128 formed thereon for engaging internal threads 129 in main nut 104 in the manner described above. Further, conductor egressing end 126 may include sleeve receiving portion 130 configured to engage a rearward end 132 of sealing sleeve 114 during assembly of fitting 100. External annular flange 133 and annular rib 135 may be provided between cable receiving end 122 and conductor egressing end 126. In some embodiments, as described above in relation to FIG. 6C, rib 135 may include a splined or grooved outer surface to engage corresponding splines in an inner surface 118 (e.g., formed on internal rib 192).

Body 1302 may include an internal central bore 134 extending along a central longitudinal axis between cable receiving end 122 and conductor egressing end 126. Further, central bore 134 may include first angled annular portion 136 for engaging grounding element 1306, as described below.

Sleeve receiving portion 130 of body 1302 may include internal tubular portion 142 projecting radially inwardly from tubular bore 140 and having an inside diameter smaller than the inside diameter of the remainder of body 1302.

As shown in FIG. 13A, the forward end of internal tubular portion 142 may include annular groove 144 formed therein for receiving rearward end 132 of sealing sleeve 114, as described above. In addition, the forward end of tubular portion 142 may have an internal diameter sized to receive the exposed conductors of electrical cable 180 and may be larger than an outside diameter of a rearward portion of sealing cartridge 116, thus effectively retaining sealing cartridge 116 within sealing sleeve 114 upon assembly (or partial assembly) of fitting 100.

Consistent with embodiments described herein, cable receiving end 122 of body 1302 may include an internal annular notch 1304 for engaging corresponding barb elements 1312 formed in annular body 1308 of grounding element 1306 during insertion of grounding element 1306 into cable receiving end 122 of body 1302.

FIG. 13A includes detail illustrations of cable receiving end 122 and grounding element 1306. As shown, annular notch 1304 in body 1302 may be formed by annular rim 1305.

Figure 13B:
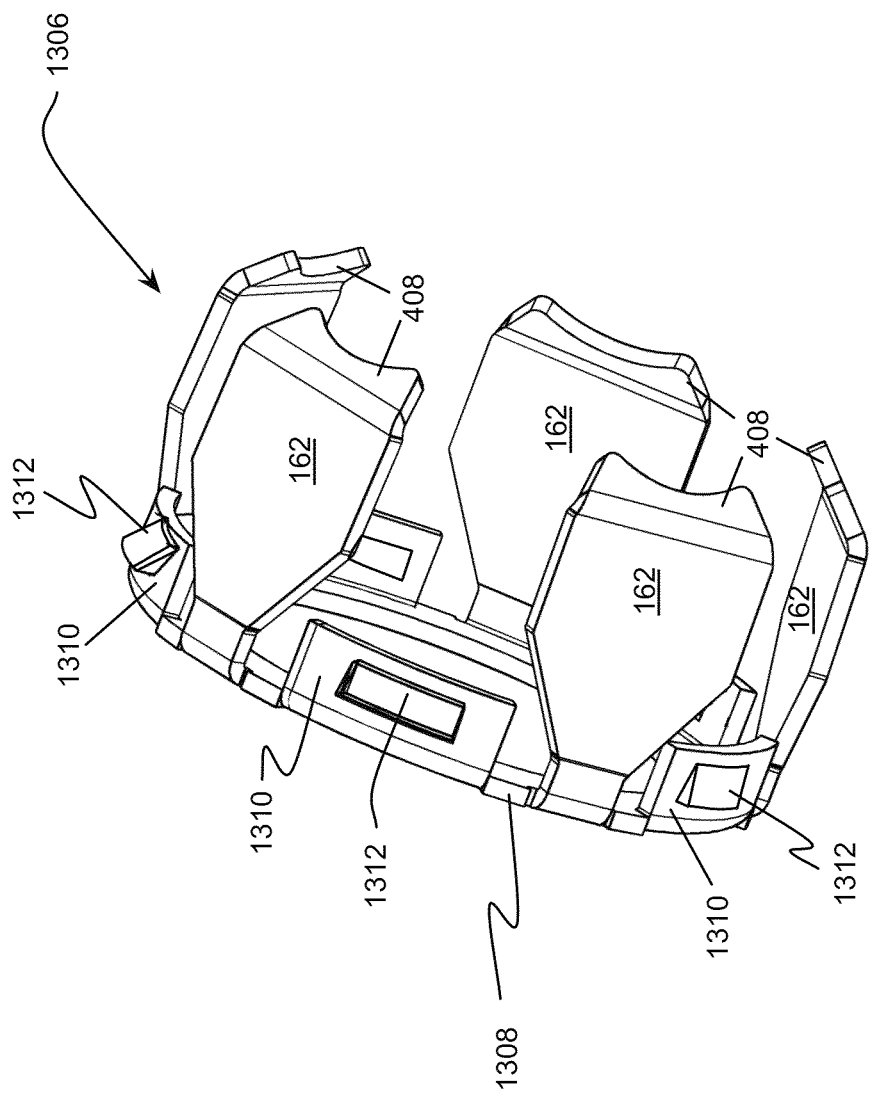
FIG. 13B is a front isometric view of the grounding element of FIG. 13A.

Further, grounding element 1306 may be configured for positioning within cable receiving portion 122 of body 1302. FIG. 13B is a front isometric view of ground element 1306. As shown, grounding element 1306 may include a substantially annular body 1308 defining a central opening 1309. A number of contact fingers 162 may extend from annular body 1308 in a radially spaced configuration. As shown, contact fingers 162 may project inwardly toward central opening 1309. Further, as shown in the detail portion of FIG. 13A, annular body 1308 may include forwardly extending barb portions 1310 extending from annular body 1308 in between contact fingers 162. Each barb portion 1310 may include a barb element 1312 projecting outwardly therefrom in a barbed or angled configuration. Upon insertion of grounding element 1306 into cable receiving end 122, barb elements 132 may engage notch 1304 and rim 1305 in body 1302, thereby retaining grounding element 1306 in body 1302 following assembly.

Similar to grounding element 106 described above, and as shown in FIG. 13B, each of contact fingers 162 may include a substantially curved end portion 408 and a proximal region 410 connected to annular body 402. Curved end portions 408 may be configured to engage an outer surface of the metallic sheath of an electrical cable. In some implementations, the relative thickness of proximal region 410 may be reduced relative to a remainder of each contact finger 162.

Figure 14:
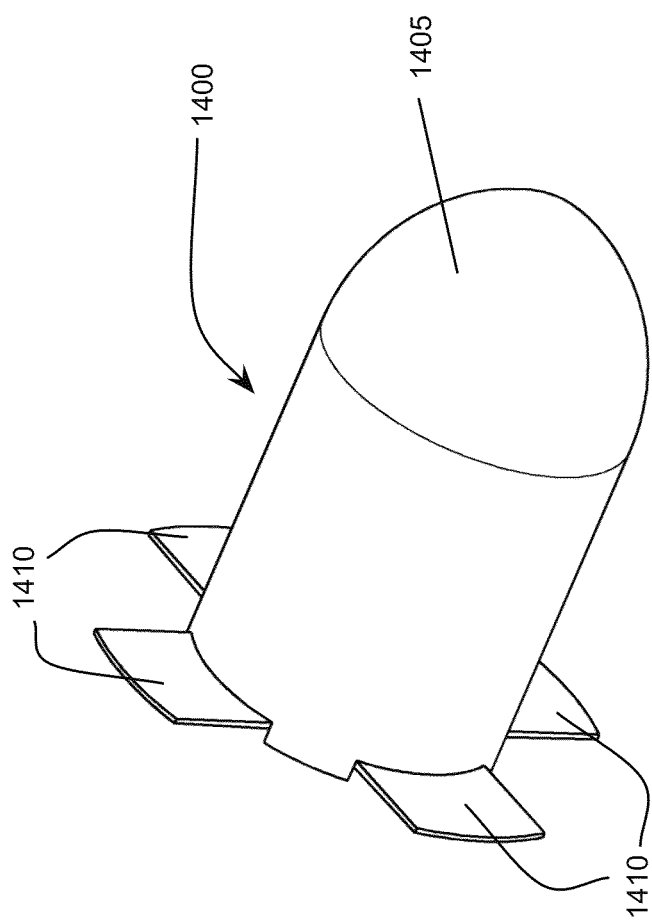
FIG. 14 is a front isometric view of an alternative cap guide element consistent with implementations described herein.

FIG. 14 is a front isometric view of an alternative cap guide element 1400 consistent with implementations described herein. As shown in FIG. 14, and contrary to the embodiments described above in relation to FIGS. 1A, 1B, 5A, 5B, 6A, and 6B, cap guide element 1400 may include a cup-shaped portion 1405 and a number of foldable tabs 1410 projecting outwardly from a rearward end of cup-shaped portion 1405. Referring to fitting 100 described above in relation to FIG. 1A, upon initial assembly of gland nut 112 to main nut 104 (e.g. via corresponding threads 172/174), foldable tabs 1410 may be secured within fitting between the rearward end of main nut 104 and the forward end of compression bushing 108.

In one embodiment (not shown), rearward end of main nut 104 may be configured to include a notched portion for initially retaining foldable tabs 1410 therein.

Cup-shaped portion 1405, similar to cup-shaped portion 198 described above, may be configured to receive an end of conductors 182 as conductors 182 are introduced into fitting 100. During assembly, cable 180 may be pushed or inserted into fitting 100 and causing conductors 182 to enter cup-shaped portion 1405 of cap guide element 1400. Continued urging of cable 180 into fitting 100 causes foldable tabs 1410 to fold relative to cup-shaped portion 1405, thereby allowing cup-shaped portion 1405 to precede conductors 182 through fitting 100.

Cup-shaped portion 1405 may continue to engage the ends of conductors 182, as cable 180 is pushed through grounding element 1306 and body 1302. In this manner, conductors 182 are prevented from splaying away from an axial orientation of cable 180 and potentially becoming stuck within body 1302. After fully inserting cable 180 into fitting 100, cap guide element 1400 may be removed and discarded.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to armored or metal clad electrical cables and connectors for such cables. In other embodiments, features described herein may be implemented in relation to other types of cables.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims. No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A fitting for terminating an electrical cable having two or more conductors, comprising:
    a substantially tubular body having a central bore extending therethrough, a forward end, and a cable receiving end,
    wherein the central bore is configured to receive the electrical cable therethrough, and
    wherein the body further comprises an integrated sealing barrier located in the central bore; and
    a substantially tubular sealing sleeve configured to engage the forward end of the body during assembly of the fitting to receive the two or more conductors of the electrical cable passing through the body,
    wherein the sealing sleeve is configured to receive a sealing compound therein, such that the sealing compound flows between the two or more conductors during filling of the sealing sleeve, and
    wherein the sealing sleeve is formed of a transparent material to enable visible confirmation of sealing compound distribution and a determination that the sealing compound is free from voids or air bubbles.

2. The fitting of claim 1,
    wherein the integrated sealing barrier includes an aperture therethrough for passing the electrical cable therethrough, and
    wherein the integrated sealing barrier prevents sealing compound from entering the central bore of the body.

3. The fitting of claim 1, wherein the sealing barrier comprises a resilient elastomer.

4. A fitting for terminating an electrical cable having two or more conductors, comprising:
    a substantially tubular body having a central bore extending therethrough, a forward end, and a cable receiving end,
    wherein the central bore is configured to receive the electrical cable therethrough; and
    a substantially tubular sealing sleeve configured to engage the forward end of the body during assembly of the fitting to receive the two or more conductors of the electrical cable passing through the body,
    wherein the sealing sleeve is configured to receive a sealing compound therein, such that the sealing compound flows between the two or more conductors during filling of the sealing sleeve, and
    wherein the sealing sleeve is formed of a transparent material to enable visible confirmation of sealing compound distribution and a determination that the sealing compound is free from voids or air bubbles,
    wherein the forward end of the body further comprises:
        an inner tubular portion projecting radially inward within the central bore, wherein the inner tubular portion forms a groove in the forward end of the body for receiving a rearward portion of the sealing sleeve.

5. A fitting for terminating an electrical cable having two or more conductors, comprising:
    a substantially tubular body having a central bore extending therethrough, a forward end, and a cable receiving end,
    wherein the central bore is configured to receive the electrical cable therethrough; and
    a substantially tubular sealing sleeve configured to engage the forward end of the body during assembly of the fitting to receive the two or more conductors of the electrical cable passing through the body,
    wherein the sealing sleeve is configured to receive a sealing compound therein, such that the sealing compound flows between the two or more conductors during filling of the sealing sleeve, and
    wherein the sealing sleeve is formed of a transparent material to enable visible confirmation of sealing compound distribution and a determination that the sealing compound is free from voids or air bubbles,
    wherein the forward end of the body is sized to fit within a rearward end of the sealing sleeve, wherein the forward end of the body further comprises:
        a notch in an outer periphery thereof,
        wherein the notch is configured to engage an inward projection in the rearward end of the sealing sleeve to prevent rotation of the sealing sleeve relative to the body upon positioning of the sealing sleeve on the body.

6. The fitting of claim 5, wherein the rearward end of the sealing sleeve includes a sealant delivery aperture for receiving the sealing compound.

7. The fitting of claim 6, wherein the sealant delivery aperture is positioned within the projection.

8. The fitting of claim 6, wherein the sealing sleeve further comprises:
- a manifold portion positioned within the sealing sleeve to facilitate distribution of the sealing compound within sleeve,
- wherein the manifold portion includes a plurality of notches in a periphery thereof.

9. A fitting for terminating an electrical cable having two or more conductors, comprising:
- a substantially tubular body having a central bore extending therethrough, a forward end, and a cable receiving end,
- wherein the central bore is configured to receive the electrical cable therethrough;
- a substantially tubular sealing sleeve configured to engage the forward end of the body during assembly of the fitting to receive the two or more conductors of the electrical cable passing through the body,
- wherein the sealing sleeve is configured to receive a sealing compound therein, such that the sealing compound flows between the two or more conductors during filling of the sealing sleeve,
- wherein the sealing sleeve is formed of a transparent material to enable visible confirmation of sealing compound distribution and a determination that the sealing compound is free from voids or air bubbles; and
- a tubular sealing cartridge configured for receipt within the sealing sleeve prior to engagement of the sealing sleeve with the body,
- wherein the sealing cartridge includes a number of longitudinal notches therein for receiving the two or more conductors and for maintaining the two or more conductors in a spaced relationship.

10. The fitting of claim 9, wherein the sealing cartridge is formed of a transparent material.

11. The fitting of claim 9, wherein the sealing sleeve includes a shoulder portion and wherein the sealing cartridge includes a corresponding shoulder portion to engage the shoulder portion of the sealing sleeve during insertion of the sealing cartridge within the sealing sleeve.

12. The fitting of claim 9, wherein the sealing cartridge further includes a sealant delivery tube formed axially within a forward portion of the sealing cartridge for receiving the sealing compound,
- wherein a rearward portion of the sealing cartridge includes a sealant receiving chamber coupled to the sealant delivery tube for allowing the sealing compound to flow from the sealant delivery tube between the two or more conductors in the positioned in number of longitudinal notches following insertion of the sealing cartridge within the sealing sleeve.

13. The fitting of claim 12, wherein one or more of the longitudinal notches extend along an entire length of the sealing cartridge.

14. A fitting for terminating an electrical cable having two or more conductors, comprising:
- a substantially tubular body having a central bore extending therethrough, a forward end, and a cable receiving end,
- wherein the central bore is configured to receive the electrical cable therethrough;
- a substantially tubular sealing sleeve configured to engage the forward end of the body during assembly of the fitting to receive the two or more conductors of the electrical cable passing through the body,
- wherein the sealing sleeve is configured to receive a sealing compound therein, such that the sealing compound flows between the two or more conductors during filling of the sealing sleeve,
- wherein the sealing sleeve is formed of a transparent material to enable visible confirmation of sealing compound distribution and a determination that the sealing compound is free from voids or air bubbles;
- a substantially tubular hub nut positioned forward of the sealing sleeve following receipt of the sealing compound in the sealing sleeve,
- wherein the hub nut includes a bore therein for receiving the sealing sleeve;
- a main nut rotatably coupled to each of the cable receiving end of the body and the hub nut;
- a gland nut rotatably coupled to a cable receiving end of the main nut; and
- a substantially tubular compression bushing positioned between the gland nut and the main nut,
- wherein axial movement of the gland nut relative to the main nut cause compression of the compression bushing to retaining the electrical cable in the fitting.

15. The fitting of claim 14, further comprising:
- a cap guide ring axially positioned between the gland nut and the main nut,
- wherein the cap guide ring comprises:
- an annular body and a cup-shaped portion detachably coupled to the annular body by a number of spokes,
- wherein forward advancement of the electrical cable through the gland nut causes the two or more conductors to engage the cup-shaped portion, and
- wherein continued forward advancement of the electrical cable in the fitting causes the cup-shaped portion to detach from the spokes to maintain the two or more conductors in a grouped relationship as the electrical cable proceeds through the fitting.

16. The fitting of claim 14, wherein the body includes an annular flange projecting from an intermediate portion thereof, wherein the main nut comprises a main nut and a coupler nut,
- wherein the main nut is rotatably coupled to the cable receiving end of the body,
- wherein the coupler nut is rotatably coupled to a rearward end of the hub nut, and
- wherein the coupler nut is sized to abut the annular flange in the body during assembly of the fitting, to secure the body to the hub nut.

17. A method for installing an explosion-proof fitting, comprising:
- coupling a forward end of a substantially tubular main nut to a rearward end of a fitting body,
- wherein the fitting body includes a central bore extending therethrough and a forward end opposing the rearward end;
- inserting an electrical cable having two or more separated conductors extending therefrom through the main nut and the fitting body, such that the two or more separated conductors extend from the fitting body;
- inserting the two or more separated conductors through a generally tubular sealing sleeve;
- engaging a rearward end of the sealing sleeve with the forward end of the fitting body;
- injecting an explosion-resistant sealing compound into the sealing sleeve, such that the sealing compound flows between the two or more conductors;

inserting the two or more separated conductors extending from a forward end of the sealing sleeve through a hub nut; and coupling the hub nut to the main nut to secure the fitting body between the hub nut and main nut.

18. The method of claim 17, wherein inserting the two or more separated conductors through a generally tubular sealing sleeve further comprises:

inserting the two or more separated conductors into a corresponding number of longitudinal notches in a sealing cartridge, such that the two or more separated conductors are maintained in a spaced relationship; and inserting the sealing cartridge into the sealing sleeve.

19. The method of claim 18, wherein the sealing sleeve and the sealing cartridge comprise a transparent material.

20. The method of claim 17, wherein the fitting body includes a sealing barrier in the central bore, and wherein the sealing barrier conforms to an outer surface of the electrical cable to prevent flow of the explosion-resistant sealing compound into the fitting body.

21. The method of claim 17, further comprising:

inserting a cap guide ring in a substantially tubular gland nut, wherein the cap guide ring includes an annular body and a cup-shaped portion detachably coupled to the annular body by a number of spokes;

coupling the gland nut to a rearward portion of the main nut;

inserting the at least two separated conductors of the electrical cable through the gland nut to engage the cup-shaped portion of the cap guide ring, such insertion causing the cup-shaped portion to detach from the annular body; and continuing insertion of the electrical through the main nut and the fitting body, with the cup-shaped portion affixed to ends of the two or more separated conductors.

22. A fitting for terminating an electrical cable having two or more conductors, comprising:

a substantially tubular fitting body having a central bore extending therethrough, a forward end, and a cable receiving end, wherein the central bore is configured to receive the electrical cable therethrough;

a main nut rotatably coupled to the cable receiving end of the fitting body;

a gland nut rotatably coupled to a cable receiving end of the main nut; and a cap guide element positioned between the gland nut and the main nut, wherein the cap guide element comprises a cup-shaped portion for receiving the two or more conductors, wherein forward advancement of the electrical cable through the gland nut causes the two or more conductors to engage the cup-shaped portion, and wherein continued forward advancement of the electrical cable in the fitting causes the cup-shaped portion to advance through the fitting to maintain the two or more conductors in a grouped relationship as the electrical cable proceeds through the fitting.

23. The fitting of claim 22, wherein the cap guide element comprises:

an annular body, wherein the cup-shaped portion is detachably coupled to the annular body by a number of spokes, and wherein the continued forward advancement of the electrical cable in the fitting causes the cup-shaped portion to detach from the spokes.

24. The fitting of claim 22, wherein the cap guide element comprises;

a plurality of foldable tabs projecting outwardly from the cup-shaped portion, wherein the continued forward advancement of the electrical cable in the fitting causes the plurality of foldable tabs to fold relative to the cup-shaped portion thereby allowing the cup-shaped portion to advance through the fitting.

* * * * *